US010372646B2

(12) United States Patent
Henson

(10) Patent No.: US 10,372,646 B2
(45) Date of Patent: Aug. 6, 2019

(54) PROGRAMMABLE ADAPTER BETWEEN SLOW PERIPHERALS AND NETWORK ON-CHIP INTERFACES

(71) Applicant: Western Digital Technologies, Inc., San Jose, CA (US)

(72) Inventor: James V. Henson, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 209 days.

(21) Appl. No.: 15/639,832

(22) Filed: Jun. 30, 2017

(65) Prior Publication Data

US 2019/0004987 A1     Jan. 3, 2019

(51) Int. Cl.
| | |
|---|---|
| *G06F 13/12* | (2006.01) |
| *G06F 13/24* | (2006.01) |
| *G06F 13/38* | (2006.01) |
| *G06F 13/40* | (2006.01) |
| *G06F 13/42* | (2006.01) |
| *G06F 15/78* | (2006.01) |

(52) U.S. Cl.
CPC .......... *G06F 13/387* (2013.01); *G06F 13/124* (2013.01); *G06F 13/24* (2013.01); *G06F 13/404* (2013.01); *G06F 13/4022* (2013.01); *G06F 13/4282* (2013.01); *G06F 15/7825* (2013.01)

(58) Field of Classification Search
CPC ...... G06F 13/124; G06F 13/24; G06F 13/387; G06F 13/4022; G06F 13/404; G06F 13/4282; G06F 15/7825
See application file for complete search history.

(56) References Cited

U.S. PATENT DOCUMENTS

| | | | | |
|---|---|---|---|---|
| 6,751,695 B1* | 6/2004 | Jirgal | ..................... | G06F 13/404 710/305 |
| 2007/0198762 A1* | 8/2007 | Xiong | ................... | G06F 13/387 710/315 |
| 2014/0297948 A1* | 10/2014 | Vorbach | ..................... | G06F 8/45 711/114 |
| 2015/0248371 A1* | 9/2015 | Zheng | ................... | G06F 13/387 710/315 |

* cited by examiner

*Primary Examiner* — Eric T Oberly
(74) *Attorney, Agent, or Firm* — Foley & Lardner LLP

(57) ABSTRACT

A method and system for adapting communication between a low-speed interface and a high-speed interface is disclosed. The method includes retrieving configuration instructions in response to a power-up of a microcontroller, where the configuration instructions associated with a low-speed communication protocol. The method includes sending the configuration instructions to a low-speed interface module causing the low-speed interface module to configure an interface of the low-speed interface module based on the configuration instructions. The method includes receiving, by the interface of the low-speed interface module, data associated with the low-speed communication protocol. The method includes retrieving, by the microcontroller, mapping instructions associated with a high-speed communication protocol. The method also includes sending, by the microcontroller, the mapping instructions to the low-speed interface module, causing the low-speed interface module to convert the data associated with the low-speed communication protocol to data associated with the high-speed communication protocol.

24 Claims, 7 Drawing Sheets

| Instruction | Op Code | X | Bytes | Description | ASM |
|---|---|---|---|---|---|
| NOP | 00 | | 1 | No Operation | NOP |
| BEQ | 01 | X | 2 | Branch if Equal | BEQ Label |
| BNE | 02 | X | 2 | Branch if Not Equal | BNE Label |
| BRA | 03 | | 2 | Branch Always | BRA Label |
| AND | 04 | X | 2 | AND ACC Immediate, Result in ACC | AND #Value |
| COM | 05 | X | 1 | Complement the ACC | COM |
| EOR | 06 | X | 2 | XOR ACC Immediate, Result in ACC | EOR #Value |
| EORX | 07 | X | 1 | XOR ACC with X, Result in ACC | EOR X |
| EORY | 08 | X | 1 | XOR ACC with Y, Result in ACC | EOR Y |
| ORA | 09 | X | 2 | OR ACC Immediate, Result in ACC | ORA #Value |
| LSL | 0A | X | 2 | Logical Shift Left ACC | LSL #Value |
| LSR | 0B | X | 2 | Logical Shift Right ACC | LSR #Value |
| DECA | 0C | X | 1 | Decrement ACC | DECA |
| DECX | 0D | | 1 | Decrement X | DECX |
| DECY | 0F | | 1 | Decrement Y | DECY |
| INCA | 10 | X | 1 | Increment ACC | INCA |
| INCX | 11 | | 1 | Increment X | INCX |
| INCY | 12 | | 1 | Increment Y | INCY |
| LDA | 13 | X | 2 | Load ACC Immediate | LDA #Value |
| LDAI | 14 | X | 2 | Load ACC from IO Space | LDAI #Addr |
| LDAJ | 15 | | 3 | Load ACC from IO Location in X | LDAJ X |
| LDAK | 16 | X | 3 | Load ACC from IO Location in Y | LDAJ Y |
| LDAM | 17 | X | 1 | Load ACC from Mem | LDAM #Addr |
| LDMX | 18 | | 3 | Load ACC from Memory Location in X | LDAM X |
| LDMY | 19 | X | 3 | Load ACC from Memory Location in Y | LDAM Y |
| LDX | 1A | X | 2 | Load X Immediate | LDX #Value |
| LDY | 1B | | 2 | Load Y Immediate | LDY #Value |
| STAI | 1C | X | 2 | Store ACC to IO Space | STAI #Addr |
| STAJ | 1D | | 1 | Store ACC to IO Location in X | STAI X |
| STAK | 1E | | 1 | Store ACC to IO Location in Y | STAI Y |
| STAM | 1F | | 2 | Store ACC to Memory | STAM #Addr |
| STMX | 20 | | 1 | Store ACC to Memory Location in X | STAM X |
| STMY | 21 | | 1 | Store ACC to Memory Location in Y | STAM Y |
| TAX | 22 | | 1 | Transfer ACC to X | TAX |
| TXA | 23 | X | 1 | Transfer X to ACC | TXA |
| TAY | 24 | | 1 | Transfer ACC to Y | TAY |
| TYA | 25 | | 1 | Transfer Y to ACC | TYA |
| WFI | 26 | | 2 | Wait for Interrupt | WFI |
| JSR | 27 | | 2 | Jump to Subroutine | JSR Label |
| RET | | | 1 | Return from Subroutine | RET |

Table 400

Fig. 4

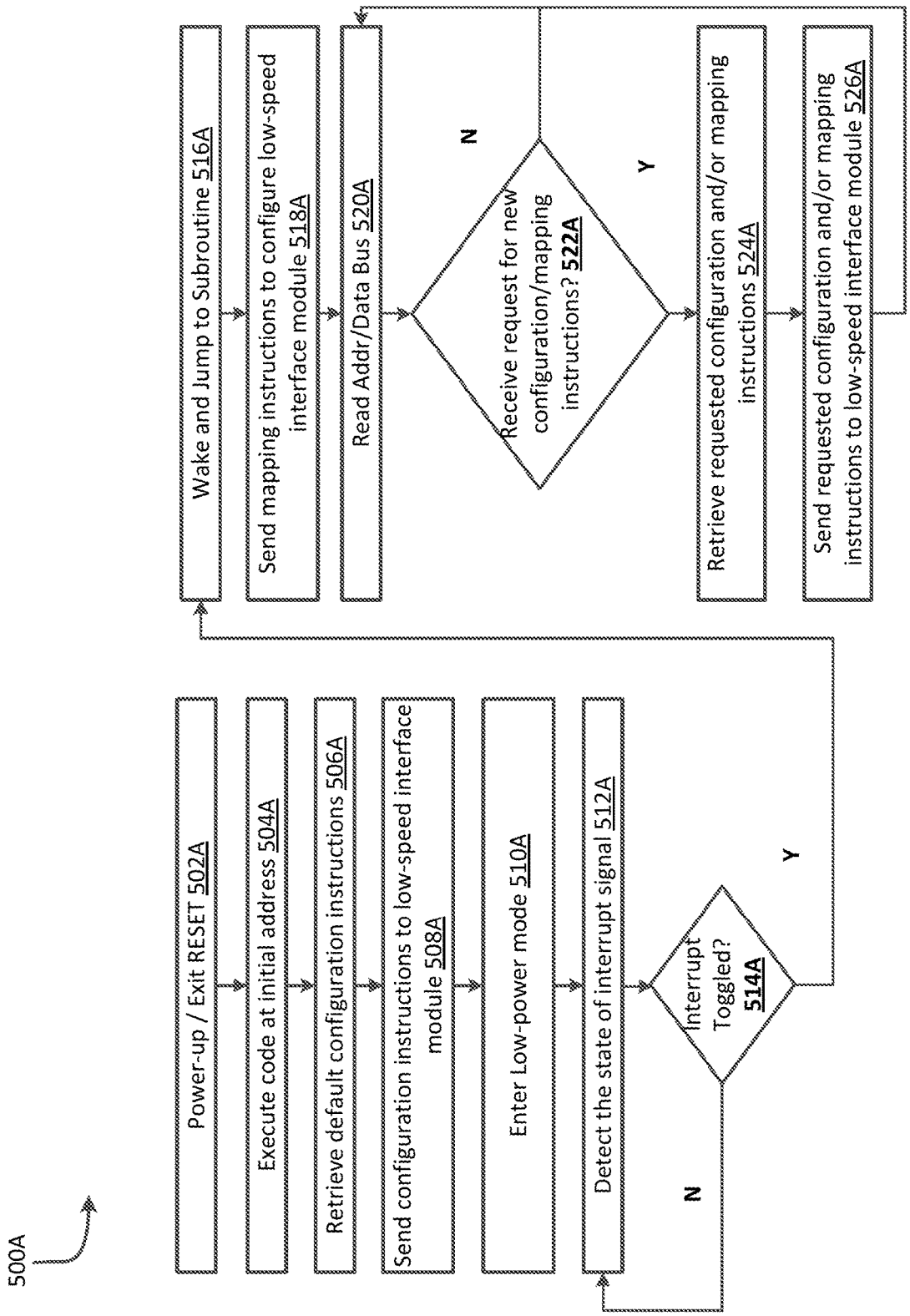

PROGRAMMABLE ADAPTER BETWEEN SLOW PERIPHERALS AND NETWORK ON-CHIP INTERFACES

BACKGROUND

Electronic equipment, such as personal computers, servers, and mobile devices include integrated circuits and system-on-chip devices. Interface protocols and communication standards establish a set of rules that allow the integrated circuits to communicate to one another through their interfaces.

SUMMARY

In the field of system-on-chip integrated circuits and FPGAs, microprocessor based peripheral devices connect to larger networks of digital devices. Such peripheral devices generally consist of digital circuitry performing a predetermined function, but requiring control from external smart logic, such as a microprocessor. For a peripheral device of this type to work autonomously requires a direct connection to dedicated smart logic. In conventional systems, a general purpose microprocessor is used to connect a low-speed peripheral device to the larger network. However, using a dedicated general purpose microprocessor to perform this interface function comes with the added cost of occupying more logic area and consuming more power. Furthermore, general purpose microprocessors are designed for much more complicated tasks and include capabilities that the interface may likely not use. Accordingly, the present disclosure is directed to systems and methods for adapting communication between a relatively low-speed interface and a relatively high-speed interface.

In general, the present disclosure describes an interface adapter that includes a programmable microcontroller surrounded by bus protocol interface logic. The microcontroller is specifically designed to control the interaction between interface modules using a microsequencer-controlled machine cycle. The interface adapter is capable of autonomously adapting the low-speed interface of a peripheral device to the high-speed interface of a network on-chip device.

The operations look-up-table of the microsequencer is used to implement the proprietary instruction operation (OP) code. An assembly language compiler is used to generate the contents of the instruction memory. The assembler outputs a source file (e.g., Verilog) containing the contents of the instruction read-only memory (ROM), which can be used both for simulation and synthesis of the logic. Consequently, the interface adapter's logic and the microcontroller provide a much smaller and much lower power solution for adapting an interface controller to a network-on-chip environment as compared to a general purpose, embedded microcontroller plus custom interface logic. In some implementations, the interface adapter adapts a high-speed network on-chip interface to a low-speed interface peripheral.

Aspects of the present disclosure relate generally to digital logic found in integrated circuits (IC) and Field Programmable Gate Arrays (FPGA), and more particularly to systems and methods for adapting a relatively low-speed interface of a microprocessor-based peripheral device to the relatively high-speed interface of a larger network. The present disclosure further relates to the autonomous operation of such digital logic whereby the larger network of devices operate independent of the peripheral and its connection to the greater network.

One implementation disclosed herein is a method for adapting communication between a low-speed interface and a high-speed interface. The method includes retrieving, by a microcontroller and via an instruction bus, configuration instructions in response to a power-up of the microcontroller. In one implementation, the configuration instructions are associated with a low-speed communication protocol and with a different higher speed communication interface. The method also includes sending, by the microcontroller and via an address/data bus, the configuration instructions to a low-speed interface module causing the low-speed interface module to configure an interface of the low-speed interface module based on the configuration instructions. The method also includes sending, by the microcontroller and via an address/data bus, the configuration instructions to a high-speed interface module causing the high-speed interface module to configure the high-speed interface based on the configuration instructions.

The method also includes entering, by the microcontroller, a low-power mode whereby the microcontroller can be instructed to wait for activity from either the low-speed interface module, the high-speed interface module or both. The method also includes receiving, by way of the interface of the low-speed interface module, data carried via the low-speed communication protocol. The method also includes changing, by way of the low-speed interface module and in response to receiving the data, the state of an interrupt signal causing the microcontroller to wake from the low-power mode. The method also includes receiving, by way of the interface of the high-speed interface module, data carried via the high-speed communication protocol. The method also includes changing, by way of the high-speed interface module and in response to receiving the data, the state of an interrupt signal causing the microcontroller to wake from the low-power mode.

In one implementation, retrieving configuration instructions includes executing, by the microcontroller and via the instruction bus, instructions stored at an initial address of an instruction memory, which is separate from the microcontroller and dedicated to the microcontroller. In one implementation, the address/data bus is separate from the instruction bus, the address/data bus is separate from the memory bus, and the memory bus is separate from the instruction bus.

One implementation enters the low-power mode when executing, by the microcontroller and via the instruction bus, a wait for interrupt (WFI) instruction. One implementation exits the low-power mode by when an interrupt is generated by the low-speed interface module or by when an interrupt is generated by the high-speed interface module. Upon exiting the low-power mode, a jump to another point in the instruction memory is made and the instruction at that address in the instruction memory is executed.

In one implementation, the program stored in the instruction memory can be used to execute one of many instruction subroutines based on information captured in the low-speed interface module after an interrupt from low-speed interface module has been generated to the microcontroller. In one embodiment, the subroutine may interrogate registers within the low-speed interface module via the Addr/Data bus and subsequently execute different sections of instruction code based on branch condition instructions. In another embodiment the subroutine may also interrogate memory locations on the memory bus and subsequently execute different sections of code based on branch condition instructions. In one implementation, the method further includes sending, by the microcontroller and via the address/data bus, new mapping instructions to the low-speed interface module causing the low-speed interface module to convert the data associated with the low-speed communication protocol to data associated with the new high-speed communication protocol.

One implementation disclosed herein is a method for adapting communication between a low-speed interface and a high-speed interface. The method includes retrieving, by a microcontroller and via a memory bus, configuration instructions in response to a power-up of the microcontroller. In some implementations, the configuration instructions are associated with a low-speed communication protocol. The method also includes sending, by the microcontroller and via an address/data bus, the configuration instructions to a low-speed interface module causing the low-speed interface module to configure an interface of the low-speed interface module based on the configuration instructions. The method also includes entering, by the microcontroller, a low-power mode. The method also includes receiving, by the interface of the low-speed interface module, data associated with the low-speed communication protocol. The method also includes changing, by the low-speed interface module and in response to receiving the data, a state of an interrupt signal causing the microcontroller to wake from the low-power mode. The method also includes retrieving, by the microcontroller via an instruction bus, mapping instructions associated with a high-speed communication protocol. The method also includes sending, by the microcontroller and via the address/data bus, the mapping instructions to the low-speed interface module, causing the low-speed interface module to convert the data associated with the low-speed communication protocol to data associated with the high-speed communication protocol.

In some implementations, retrieving configuration instructions from memory includes receiving, by the microcontroller and via the address/data bus, a request for the configuration instructions from the low-speed interface module. In some implementations, the request includes the low-speed communication protocol. In some implementations, retrieving configuration instructions includes executing, by the microcontroller and via the instruction bus, instructions stored at an initial address of an instruction memory. In some implementations, the instruction memory is separate from the microcontroller and dedicated to the microcontroller. In some implementations, the address/data bus is separate from the instruction bus, the address/data bus is separate from the memory bus, and the memory bus is separate from the instruction bus.

In some implementations, entering the low-power mode includes executing, by the microcontroller and via the instruction bus, a wait for interrupt (WFI) instruction stored at a first address of an instruction memory. In some implementations, the instruction memory is separate from the microcontroller and dedicated to the microcontroller. In some implementations, retrieving mapping instructions associated with the high-speed communication protocol includes executing, by the microcontroller and via the instruction bus, a jump to subroutine (JSR) instruction stored at a second address of the instruction memory, causing the microcontroller to execute a subroutine stored at a third address of the instruction memory, the third address stored after the second address.

In some implementations, the method further includes receiving, by the microcontroller and via the address/data bus, a request for new configuration instructions from the low-speed interface module. In some implementations, the request for new configuration instructions includes a new low-speed communication protocol. In some implementations, the low-speed communication protocol is different than the new low-speed communication protocol. In some implementations, the method further includes sending, by the microcontroller and via the address/data bus, new mapping instructions to the low-speed interface module causing the low-speed interface module to convert the data associated with the low-speed communication protocol to data associated with the new high-speed communication protocol. In some implementations, the high-speed communication protocol is different than the new high-speed communication protocol.

In some implementations, the low-speed communication protocol comprises at least one of Advanced Microcontroller Bus Architecture (AMBA) Advanced System Bus (ASB), AMBA Advanced Peripheral Bus (APB), AMBA High-Performance Bus (HPB), and AMBA AXI industry standard interfaces. In some implementations, the high-speed communication protocol comprises at least one of AMBA ASB, AMBA APB, AMBA HPB, and AMBA AXI industry standard interfaces. In some implementations, a data rate of the low-speed communication protocol is lower than a data rate of the high-speed communication protocol.

In some implementations, the method further includes receiving, by an interface of a high-speed interface module, data associated with the high-speed communication protocol. In some implementations, the method further includes sending, by the microcontroller and via the address/data bus, new mapping instructions to the high-speed interface module causing the high-speed interface module to convert the data associated with the high-speed communication protocol to data associated with the low-speed communication protocol.

In another aspect, the present disclosure is directed to an interface adapter for adapting communication between a low-speed interface and a high-speed interface. The interface adapter includes a microcontroller having a first input terminal, a second input terminal, a first bidirectional terminal, a second bidirectional terminal, and a third bidirectional terminal. The interface adapter a high-speed interface module having an output terminal, a first bidirectional terminal, a second bidirectional terminal, and a third bidirectional terminal, wherein the output terminal couples to the second input terminal of the microcontroller. The interface adapter includes a low-speed interface module having an output terminal coupled to the first input terminal of the microcontroller, a first bi-directional terminal, a second bidirectional terminal coupled to the third bidirectional terminal of the microcontroller and the second bidirectional terminal of the high-speed interface module, and a third bidirectional terminal coupled to a third bidirectional terminal of the high-speed interface module. The interface adapter includes an instruction memory having a bidirectional output terminal coupled to the second bidirectional terminal of the microcontroller.

In some implementations, the interface adapter includes a memory comprising a bidirectional terminal coupled to the first bidirectional terminal of the microcontroller. In some implementations, the interface adapter includes the microcontroller adapted to send, via the third bidirectional terminal of the microcontroller, configuration instructions associated with a low-speed communication protocol to the low-speed interface module causing the low-speed interface module to configure an interface associated with the first bidirectional terminal of the low-speed interface module based on the configuration instructions. In some implementations, the low-speed interface module adapted to change, in response to receiving data on the interface that is associated with a low-speed communication protocol, a state of an interrupt signal causing the microcontroller to wake from a low-power mode.

In some implementations, the microcontroller adapted to retrieve, via the first bidirectional terminal of the microcontroller, mapping instructions associated with a high-speed communication protocol. In some implementations, the microcontroller adapted to send, via the third bidirectional terminal of the microcontroller, the mapping instructions to the low-speed interface module, causing the low-speed interface module to convert the data associated with the low-speed communication protocol to data associated with the high-speed communication protocol. In some implementations, the microcontroller adapted to execute, via the second bidirectional terminal of the microcontroller, a jump to subroutine (JSR) instruction stored at a first address of the instruction memory, causing the microcontroller to execute a subroutine stored at a second address of the instruction memory. In some implementations, the second address is stored after the first address. In some implementations, the subroutine causes the microcontroller to retrieve mapping instructions associated with the high-speed communication protocol.

In some implementations, the high-speed interface module adapted to receive data associated with the high-speed communication protocol. In some implementations, the microcontroller adapted to send, via the third bidirectional terminal of the microcontroller, new mapping instructions to the high-speed interface module causing the high-speed interface module to convert the data associated with the high-speed communication protocol to data associated with the low-speed communication protocol.

In some implementations, the low-speed communication protocol comprises at least one of Advanced Microcontroller Bus Architecture (AMBA) Advanced System Bus (ASB), AMBA Advanced Peripheral Bus (APB), AMBA High-Performance Bus (HPB), and AMBA AXI industry standard interfaces. In some implementations, the high-speed communication protocol comprises at least one of AMBA ASB, AMBA APB, AMBA HPB, and AMBA AXI industry standard interfaces. In some implementations, a data rate of the low-speed communication protocol is lower than a data rate of the high-speed communication protocol.

In some implementations, the microcontroller adapted to enter a low-power mode by executing, via the second bidirectional terminal of the microcontroller, a wait for interrupt (WFI) instruction stored at a first address of the instruction memory. In some implementations, the instruction memory is separate from the microcontroller and dedicated to the microcontroller.

In another aspect, the present disclosure is directed a non-transitory computer readable storage medium to store a computer program configured to execute a method for adapting communication between a low-speed interface and a high-speed interface. The method includes retrieving, by a microcontroller and via a memory bus, configuration instructions in response to a power-up of the microcontroller. In some implementations, the configuration instructions are associated with a low-speed communication protocol. The method also includes sending, by the microcontroller and via an address/data bus, the configuration instructions to a low-speed interface module causing the low-speed interface module to configure an interface of the low-speed interface module based on the configuration instructions. The method also includes entering, by the microcontroller, a low-power mode.

The method also includes receiving, by the interface of the low-speed interface module, data associated with the low-speed communication protocol. The method also includes changing, by the low-speed interface module and in response to receiving the data, a state of an interrupt signal causing the microcontroller to wake from the low-power mode. The method also includes retrieving, by the microcontroller via an instruction bus, mapping instructions associated with a high-speed communication protocol. The method also includes sending, by the microcontroller and via the address/data bus, the mapping instructions to the low-speed interface module, causing the low-speed interface module to convert the data associated with the low-speed communication protocol to data associated with the high-speed communication protocol.

In some implementations, the method includes receiving, by an interface of a high-speed interface module, data associated with the high-speed communication protocol. In some implementations, the method includes sending, by the microcontroller and via the address/data bus, new mapping instructions to the high-speed interface module causing the high-speed interface module to convert the data associated with the high-speed communication protocol to data associated with the low-speed communication protocol.

In another aspect, the present disclosure is directed an interface adapter for adapting communication between two interfaces. The interface adapter includes a microcontroller comprising a first input terminal, a second input terminal, a first bidirectional terminal, a second bidirectional terminal, and a third bidirectional terminal. The interface adapter also includes a transmitting interface module comprising an output terminal, a first bidirectional terminal, a second bidirectional terminal, and a third bidirectional terminal. The output terminal couples to the second input terminal of the microcontroller.

The interface adapter includes a receiving interface module comprising an output terminal coupled to the first input terminal of the microcontroller, a first bi-directional terminal, a second bidirectional terminal coupled to the third bidirectional terminal of the microcontroller and the second bidirectional terminal of the high-speed interface module, and a third bidirectional terminal coupled to a third bidirectional terminal of the high-speed interface module. The interface adapter includes an instruction memory comprising a bidirectional output terminal coupled to the second bidirectional terminal of the microcontroller.

In some implementations, the transmitting interface module is associated with a low-speed communication protocol and the receiving interface module is associated with a high-speed communication protocol. In some implementations, the low-speed communication protocol comprises at least one of Advanced Microcontroller Bus Architecture (AMBA) Advanced System Bus (ASB), AMBA Advanced Peripheral Bus (APB), AMBA High-Performance Bus (HPB), and AMBA AXI industry standard interfaces. In some implementations, the high-speed communication protocol comprises at least one of AMBA ASB, AMBA APB, AMBA HPB, and AMBA AXI industry standard interfaces. In some implementations, a data rate of the low-speed communication protocol is lower than a data rate of the high-speed communication protocol.

BRIEF DESCRIPTION OF THE DRAWINGS

The accompanying drawings, which are incorporated herein and constitute part of this specification, illustrate examples described in the disclosure, and together with the general description given above and the detailed description given below, serve to explain the features of the various implementations.

FIG. 4 is a table 400 depicting instructions and assembly language references that microcontroller 104 may execute when adapting communication between a low-speed interface and a high-speed interface, in accordance with an illustrative implementation.

FIG. 5A is a flow diagram depicting a process 500A for adapting communication from a low-speed interface to a high-speed interface, in accordance with an illustrative implementation.

Like reference numbers and designations in the various drawings indicate like elements.

DETAILED DESCRIPTION

Various implementations will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

Figure 1:
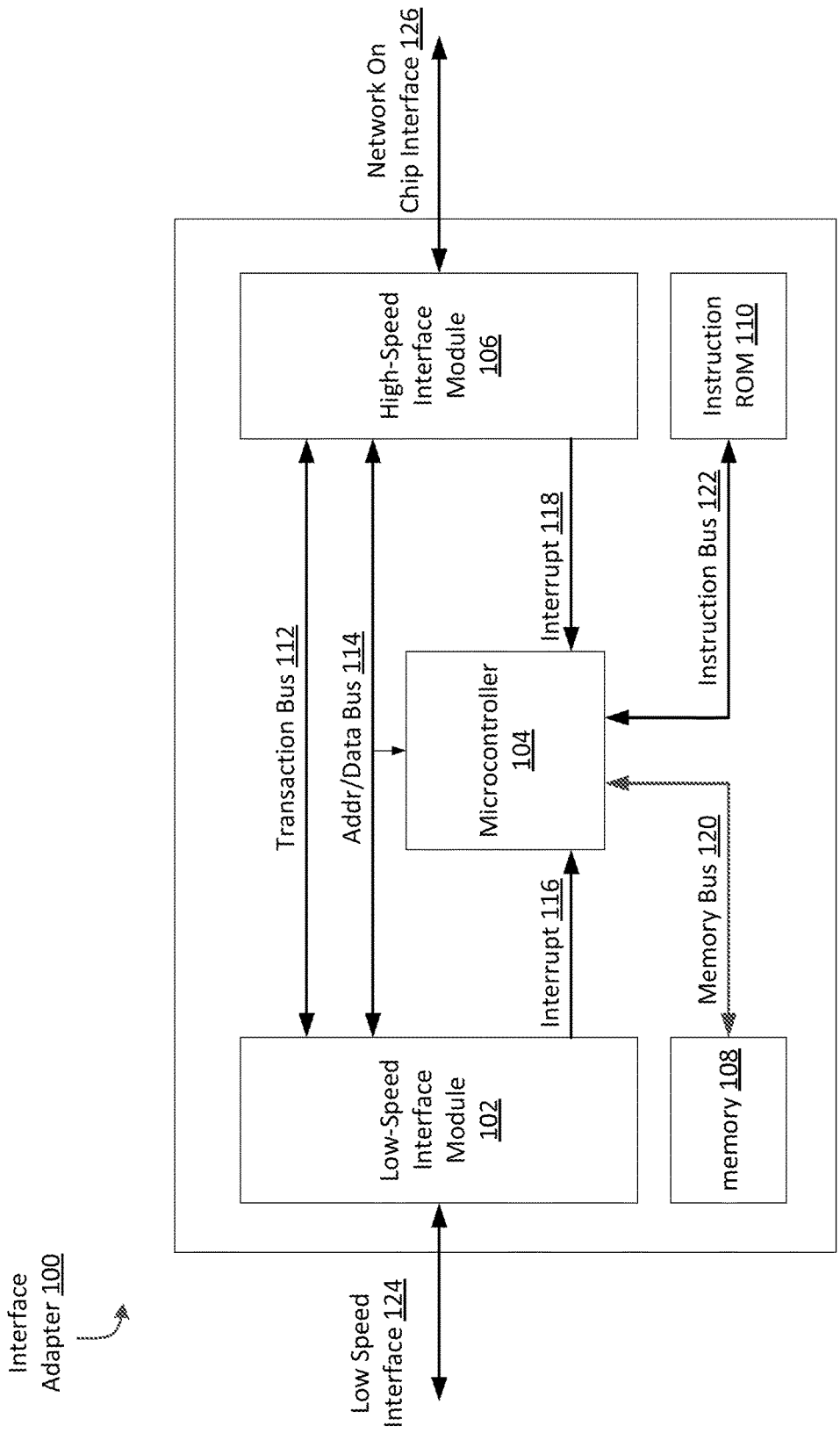
FIG. 1 is a block diagram depicting an interface adapter 100 for adapting communication between a low-speed interface and a high-speed interface, in accordance with an illustrative implementation.

FIG. 1 is a block diagram depicting an interface adapter 100 for adapting communication between a low-speed interface and a high-speed interface, in accordance with an illustrative implementation. In general, the interface adapter 100 includes a microcontroller (e.g., microcontroller 104), housed within interface adapter 100, for fetching instructions from memory (e.g., read-only memory (ROM)) when interrupted by either a low-speed interface module (e.g., low-speed interface module 102) or high-speed interface module (e.g., high-speed interface module 106). Using status information collected in the interface modules, the microcontroller provides operations to convert the information from one interface module to be used by the other interface module. The low-speed interface module may be connected to any type of interface module including, but not limited to, an Inter-Integrated Circuit (I2C) controller, Serial Peripheral Interface (SPI) controller, an Advanced Microcontroller Bus Architecture (AMBA) Advanced Peripheral Bus (APB) bridge, an AMBA High-Performance Bus (AHB) bridge, or a universal asynchronous receiver/transmitter (UART). Messages that arrive at the low-speed interface module are interpreted by the microcontroller and translated into memory or I/O transactions on the high-speed interface (e.g., network on-chip interface 126) connected to the high-speed interface module. This can be performed by the Microcontroller via an address/data bus (e.g., addr/data bus 114) or it can be performed directly between the interface adapters using the Transaction Bus (e.g., transaction bus 112).

In greater detail, interface adapter 100 includes a low-speed interface module 102 (also referred to as receiving interface module 102), memory 108, a microcontroller 104, a high-speed interface module 106 (also referred to as transmitting interface module 106), and read-only memory (shown as ROM 110). The interface adapter 100 also includes a low-speed interface 124 to support low-speed communication with a peripheral low-speed device and a network on-chip interface 126 to support high-speed communication with a peripheral network device. In some implementations, interface adapter 100 may omit memory 108 such that default settings for interface adapter 100 are stored in instruction ROM 110, internal memory (not shown) of microcontroller 104, and/or hardcoded into the assembly language. Interface adapter 100 may be implemented as an integrated circuit (IC), implemented using only discrete components, or implemented using any combination thereof. As will be discussed below, in another implementation, interface adapter 100 can include fewer, additional, and/or different components.

A first input terminal of microcontroller 104 connects to a first output terminal (e.g., interrupt 116) of low-speed interface module 102, whose first bi-directional terminal (e.g., low-speed interface 124) connects to a low-speed peripheral device (not shown). A second input terminal of microcontroller 104 connects to a first output terminal (e.g., interrupt 118) of high-speed interface module 106, whose first bidirectional terminal (e.g., network on-chip interface 126) connects to a high-speed network peripheral device (not shown). A first bi-directional terminal (e.g., memory bus 120) of microcontroller 104 connects to a bi-directional terminal of memory 108. A second bi-directional terminal (e.g., instruction bus 122) of microcontroller 104 connects to a bi-directional terminal of instruction read-only memory (ROM) 110. A third bi-directional terminal of microcontroller 104 (e.g., addr/data bus 114) connects to a second bi-directional terminal of low-speed interface module 102 and to a second bi-directional terminal of high-speed interface module 106. A third bi-directional terminal (e.g., transaction bus 112) of low-speed interface module 102 connects to a third bi-directional terminal of high-speed interface module 106.

Addr/data bus 114 is a bidirectional bus that supports communication between microcontroller 104, low-speed interface module 102, and high-speed interface module 106. For example, microcontroller 104 may send configurations instructions (discussed below) and/or mapping instructions (discussed below) to low-speed interface module 102 via addr/data bus 114. In another example, microcontroller 104 may send configurations instructions and/or mapping instructions to high-speed interface module 106 via addr/data bus 114. Addr/data bus 114 may be an interface of any number of bits, including for example, 1 bit, 2 bits, 4 bits, 8 bits, 16 bits, 32 bits, 64 bits, 128 bits, 192 bits, 256 bits, 512 bits, 1024 bits, or any other number of bits within 1 bit to 1024 bits.

Memory bus 120 is a bidirectional bus that supports communication between microcontroller 104 and memory 108. In some implementations, memory 108 is configured for read-only access. In some implementations, memory 108 may be random-access memory (RAM). In some implementations, memory 108 is configured for read-write access. As shown in FIG. 1, addr/data bus 114 and memory bus 120 are physically separate from one another. For example, program instructions (e.g., configuration instructions and mapping instructions) sent across addr/data bus 114 from microcontroller 104 do not reach memory 108 and memory instructions sent across memory bus 120 from microcontroller 104 do not reach low-speed interface module 102 or high-speed interface module 106. In some implementations, addr/data bus 114 and memory bus 120 may be a shared/combined bus. In this alternate configuration, address and data program instructions (e.g., configuration instructions and mapping instructions) sent from microcontroller 104 do reach memory 108 and memory instructions sent from microcontroller 104 do reach low-speed interface module 102 or high-speed interface module 106. Memory bus 120 may be an interface of any number of bits, including for example, 1 bit, 2 bits, 4 bits, 8 bits, 16 bits, 32 bits, 64 bits, 128 bits, 192 bits, 256 bits, 512 bits, 1024 bits, or any other number of bits within 1 bit to 1024 bits.

Low-speed interface module 102 generates an interrupt signal (e.g., interrupt 116) that ramps-up a voltage from a minimum voltage level to a maximum voltage level to cause microcontroller 104 to change state, such as waking from a power-saving mode (e.g., sleep mode) or transition from an idle state to an active state. In some implementations, low-speed interface module 102 generates an interrupt signal (e.g., interrupt 116) that ramps down a voltage from a maximum voltage level to a minimum voltage level to cause microcontroller 104 to change state. In some implementations, low-speed interface module 102 may generate a digital voltage. For example, low-speed interface module 102 may increase the voltage of interrupt 116 in fixed step sizes and for a fixed number of steps until interrupt 116 reaches a maximum voltage step, at which point, low-speed interface module 102 holds the voltage of interrupt 116 at the maximum voltage for a predetermined duration (e.g., any time between 1 picosecond and 100 milliseconds) and then drops the voltage of interrupt 116 back to the minimum voltage level. In some implementations, low-speed interface module 102 toggles or inverts the voltage of interrupt 116 from a low-voltage to a high-voltage. In some implementations, low-speed interface module 102 toggles or inverts the voltage of interrupt 116 from a high-voltage to a low-voltage. Low-speed interface module 102 may step up or step down the voltage in any number of voltage steps, for example, any number of steps between 1 and 10. A voltage step may equal to any amount of increasing or decreasing voltage, for example, any voltage between 1 millivolt and 5.0 volt. Low-speed interface module 102 may generate a sawtooth wave, a triangular wave, a step, a pulse, or pulse train.

Low-speed interface module 102 generates interrupt 116 based on activity detected on low-speed interface 124. For example, an increase in voltage above a predetermined voltage level on any of the clock and data lines of low-speed interface 124 may trigger low-speed interface module 102 to generate interrupt 116. In some implementations, a decrease in voltage below a predetermined voltage level on any of the clock and data lines of low-speed interface 124 may trigger low-speed interface module 102 to generate interrupt 116. In some implementations, low-speed interface module 102 may poll an internal register to determine if a flag is set, indicating activity on low-speed interface 124. In some implementations, low-speed interface 124 generates an interrupt for activity detected on low-speed interface 124 occurring after low-speed interface 124 is configured for a particular low-speed data communication protocol. In some implementations, low-speed interface module 102 generates interrupt 116 based on determining that an instruction received on low-speed interface 124 is specific to the current interface type. For example, a peripheral device having its I2C interface connected to low-speed interface 124 may send a READ instruction to low-speed interface 124. In response to determining that the READ instruction is a member of the instruction set supported by the I2C communication protocol, low-speed interface module 102 may transmit interrupt 116 to microcontroller 104 to cause microcontroller 104 to wake from its sleep and process the READ instruction. Conversely, if low-speed interface module 102 determines that the READ instruction is not a member of the I2C communication protocol, then low-speed interface module 102 does not send interrupt 116 to microcontroller 104.

Low-speed interface module 102 receives configuration instructions from microcontroller 104 via a bidirectional address/data bus (e.g., addr/data bus 114). The configuration instructions may configure low-speed interface module 102 for a particular low-speed data communication protocol (also referred to as low-speed communication protocol). Low-speed interface module 102 may be configured to support any low-speed data communication protocol (or type), including, in a non-limiting example, Advanced Microcontroller Bus Architecture (AMBA) Advanced System Bus (ASB), AMBA Advanced Peripheral Bus (APB), AMBA High-Performance Bus (AHB), AHB-Lite, AMBA AXI3, AMBA AXI4, AMBA Advanced Trace Bus (ATB), AMBA ACE, AMBA Coherent Hub Interface (CHI), Open Core Protocol (OCP), Universal Serial Bus (USB), a memory mapped interface, universal asynchronous receiver/transmitter (UART), RS-232, RS-422, RS-485, Inter-Integrated Circuit (I2C), Serial Peripheral Interface (SPI), General-Purpose Input/Output (GPIO), Low Voltage Differential Signaling (LVDS), Emitter Coupled Logic (ECL), Current-Mode Logic (CIVIL), Transistor-Transistor Logic (TTL), High-Speed Transceiver Logic (HSTL), Stub Series Terminated Logic (SSTL), media-independent interface (MII), Management Data Input/Output (MDIO), Wiegand, etc.

To support the low-speed data communication protocol indicated by the configuration instructions, low-speed interface module 102 may configure its low-speed interface 124 to include any number of clock and data pins. For example, low-speed interface module 102 may configure low-speed interface 124 to include a single data pin or multiple data pins that are each timed based on a single clock or multiple clocks. In some implementations, low-speed interface module 102 may configure low-speed interface 124 as a synchronous interface (i.e., timed based on a clock cycle). In some implementations, low-speed interface module 102 may configure low-speed interface 124 as an asynchronous interface (i.e., not timed based on a clock cycle); as such, low-speed interface 124 may include a clock data recovery unit (not shown) that generates a clock based on the incoming data. In some implementations, low-speed interface module 102 may configure low-speed interface 124 as a serial interface or a parallel interface.

Low-speed interface module 102 configures its low-speed interface 124 based on the received configuration instructions. Low-speed interface 124 may include an internal, dedicated resistor (not shown) having a first terminal connected to each clock and data pin of low-speed interface 124. Low-speed interface module 102 may independently configure each resistor into one of three states. In the first state, low-speed interface module 102 connects the second terminal of any of the resistors to the positive power supply (e.g., VCC) of interface adapter 100 to form a "pull-up" resistor. A pull-up resistor holds the logic signal on the associated data pin at a high logic level. In the second state, low-speed interface module 102 connects the second terminal of any of the resistors to the negative power supply (e.g., VSS) of interface adapter 100 to form a "pull-down" resistor. This configuration holds the logic signal on the associated data pin at a low logic level. In the third state, low-speed interface module 102 disconnects the second terminal of any of the resistors to form a "floating" resistor. A floating resistor results in a high-impedance state for the associated data pin. Low-speed interface module 102 may configure low-speed interface 124 to support a particular communication protocol indicated by the configuration instructions by configuring each internal resistor into one of these three states. For example, low-speed interface module 102 may receive configuration instructions to configure low-speed interface 124 as an I2C interface. In response to receiving the configuration instructions, low-speed interface module 102 may configure a pin of low-speed interface 124 as serial data (SDA), configure a pin of low-speed interface 124 as serial clock (serial clock), and configure the resistors associated with the remaining pins of low-speed interface 124 into any of the three states described herein. In some implementations, low-speed interface 124 may disable a pin of low-speed interface 124 by, for example, disabling power to the pin, configuring the pin into one of the three states described here, or ignoring information received on the pin.

Low-speed interface module 102 receives configuration instructions from microcontroller 104 upon power-up of microcontroller 104. For example, upon power-up, microcontroller 104 may send configuration instructions to low-speed interface module 102 to effectuate configuration of low-speed interface 102 for a particular low-speed data communication protocol. In some implementations, low-speed interface module 102 may receive configuration instructions from microcontroller 104 after a predetermined amount of time (e.g., any time value equal to or between 1 picosecond and 5 seconds) after power-up of microcontroller 104. In some implementations, low-speed interface module 102 may receive configuration instructions from an external computing device (e.g., a microcontroller, a microprocessor, etc.) that resides outside of interface adapter 100. In some implementations, low-speed interface module 102 may be configured based on reading default settings stored in memory. For example, low-speed interface module 102 may power-up and read default settings stored in internal memory (not shown) housed within low-speed interface module 102 and configure itself based on the default settings. The default settings may configure the interface for any one of the supported interface types described herein. In some implementations, low-speed interface module 102 may receive configuration instructions from microcontroller 104 in response to sending a request to microcontroller 104 for configuration instructions. For example, low-speed interface module 102 may determine the interface type of a low-speed peripheral device connected to its low-speed interface 124 and send a request to microcontroller 104 to request the interface instructions for the determined interface type. The request may include any information that microcontroller 104 may use to construct the configuration instructions, such as the interface type, characteristics about the data (e.g., data rate, amplitude, rise time, fall time, duty cycle, transition density, timing, etc.), and the number of clock and data pins.

Low-speed interface module 102 may send any number of requests for configuration instructions to microcontroller 104. In some implementations, each request comprises the same information. For example, low-speed interface module 102 may send a first request for configuration instructions to configure low-speed interface 124 for I2C communication and a second request for the same configuration instructions to configure low-speed interface 124 for I2C communication. In some implementations, some or all of the requests comprise different information. For example, low-speed interface module 102 may send a first request for configuration instructions to configure low-speed interface 124 for I2C communication and a second request for configuration instructions to configure low-speed interface 124 for UART communication (i.e., a different low-speed communication protocol).

Low-speed interface module 102 may determine the interface type of the low-speed peripheral device connected to its low-speed interface 124 by capturing data from low-speed interface 124 and decoding the captured data to identify information unique to a particular interface type. In some implementations, low-speed interface module 102 may determine the interface type based the electrical characteristics (e.g., number of data signals, number of clock signals, minimum voltage level, maximum voltage level, amplitude, data rate, rise time, fall time, dc bias voltage, capacitive load, output impedance) of the low-speed peripheral device connected to low-speed interface 124. In some implementations, low-speed interface module 102 may determine the interface type based on determining the circuit topology (e.g., open collector/open-drain, open-emitter/open-source) of the receiver and/or transmitter of the low-speed peripheral device connected to its low-speed interface 124. For example, low-speed interface module 102 may determine that the low-speed interface 124 is connected to the open collector/open-drain of the low-speed peripheral device; in response, low-speed interface module 102 may determine the interface type as I2C.

Low-speed interface module 102 may determine the interface type in response to the occurrence of a triggering event, such as, the power-up of interface adapter 100, the elapse of a predetermined amount of time (e.g., any time value equal to or between 1 picosecond and 5 seconds) after the power-up of microcontroller 104, the receipt of a request from microcontroller 104 for the interface type, upon the detection of activity on low-speed interface 124 by low-speed interface module 102.

In some implementations, microcontroller 104 may determine the interface type of low-speed interface 124 by using any of the same methods the low-speed module 102 may use to determine the interface type. For example, upon power-up, microcontroller 104 may determine that low-speed interface 124 is connected to an I2C interface by determining that low-speed interface 124 is connected to the open-collector of a low-speed peripheral device.

Low-speed interface module 102 receives mapping instructions from microcontroller 104 to effectuate a conversion or mapping of data from a low-speed data communication protocol to a high-speed communication protocol (described below). For example, low-speed interface module 102 may receive APB data on its low-speed interface 124. In response, low-speed interface module 102 may toggling interrupt 116 causing microcontroller 104 to wake from a low-power sleep mode. Once awake, microcontroller 104 may send mapping instructions to low-speed interface module 102 specific to mapping APB data to AXI data. Low-speed interface module 102 may then generate AXI data on transaction bus 112 from the APB data on its low-speed interface 124 based on the received mapping instructions. In some implementations, low-speed interface module 102 may generate encoded data on transaction bus 112 that matches the same low-speed data communication protocol of the data on low-speed interface module 102. For example, low-speed interface module 102 may receive I2C data on its low-speed interface 124 and toggle interrupt 116 to cause microcontroller 104 to send I2C to AXI mapping instructions to low-speed interface module 102. Low-speed interface module 102 encodes the I2C data with the received mapping instructions to generate encoded I2C data and sends the encoded data to a high-speed interface module (e.g., high-speed interface module 106) via transaction bus 112. High-speed interface module 106 decodes the received data to extract the I2C data and the mapping instructions. High-speed interface module 106 uses the mapping instructions to convert the extracted I2C data to AXI data. High-speed interface module 106 then drives the receiver of any network on-chip device (not shown) connected to network on-chip interface 126 with the AXI data.

Low-speed interface module 102 receives mapping instructions from microcontroller 104 in response to microcontroller's 104 receipt of interrupt 116. For example, low-speed interface module 102 sends interrupt 116 to microcontroller 104 and in response, microcontroller 104 sends mapping instructions to low-speed interface module 102 causing low-speed interface 102 to translate data on its low-speed interface 124 from one data communication protocol (e.g., APB) to another data communication protocol (e.g., AXI). Low-speed interface module 102 receives mapping instructions upon power-up of microcontroller 104. For example, upon power-up, microcontroller 104 may send configuration instructions, mapping instructions, or both to low-speed interface 102. In some implementations, low-speed interface module 102 may receive mapping instructions from microcontroller 104 after a predetermined amount of time (e.g., any time value equal to or between 1 picosecond and 5 seconds) after power-up of microcontroller 104. In some implementations, low-speed interface module 102 may receive mapping instructions from an external computing device (e.g., a microcontroller, a microprocessor) that resides outside of interface adapter 100. In some implementations, low-speed interface module 102 may be read default mapping instructions stored in memory. For example, low-speed interface module 102 may power-up and read default mapping settings stored in internal memory (not shown) housed within low-speed interface module 102 that describe the procedure for mapping I2C data to AXI data. In some implementations, low-speed interface module 102 may receive mapping instructions from microcontroller 104 in response to sending a request to microcontroller 104 for mapping instructions. The request may include any information that microcontroller 104 may use to construct the mapping instructions, such as the interface type, characteristics about the data (e.g., data rate, amplitude, rise time, fall time, duty cycle, transition density), the number of clock and data pins, a low-speed data communication protocol associated with low-speed interface 124, and a high-speed data communication protocol associated with network on-chip interface 126. In some implementation, low-speed interface module 102 receives mapping instructions from microcontroller 104 in response to microcontroller's 104 receipt of an interrupt (e.g., interrupt 118) from a high speed interface module 106. In some implementations, low-speed interface module 102 receives mapping instructions from microcontroller 104 without sending interrupt 116 to microcontroller 104. In some implementations, low-speed interface module 102 sends a notification to an external computing device (e.g., a microcontroller, a microprocessor) that resides outside of interface adapter 100 to indicate that data has arrived on low-speed interface 124. In turn, the external computing device toggles an interrupt signal (e.g., interrupt 116) to microcontroller 104 causing microcontroller 104 to send mapping instructions to low-speed interface module 102.

High-speed interface module 106 receives transaction data from low-speed interface module 102 via a transaction bus (e.g., transaction bus 112) and drives the received transaction data to an external network on-chip device (not shown) connected to the network on-chip interface (e.g., network on-chip interface 126) of interface adapter 100. The data rate of the transaction data received by high-speed interface module 106 may be equal to or greater than the data rate of the data carried on low-speed interface 124. For example, low-speed interface 124 may carry APB data, while transaction bus 112 may carry AXI data. In another example, low-speed interface 124 may carry APB data at a first data rate and transaction bus 112 may carry APB data at a second data rate, where first data rate is lower than second data rate. High-speed interface module 106 generates data on network on-chip interface 126 that operates at a higher data rate than the data carried on low-speed interface 124. For example, low-speed interface 124 may carry APB data, while network on-chip interface 126 may carry AXI data. In some implementations, low-speed interface 124 may carry data associated with the same communication protocol as the data carried on network on-chip interface 126, but at a lower data rate. For example, both low-speed interface 124 and network on-chip interface 126 may each carry APB data. However, low-speed interface 124 carries APB data at a data rate lower than the data rate of the APB data carried on network on-chip interface 126. In some implementations, high-speed interface module 106 may boost the amplitude or power of the data received on transaction bus 112 via a fixed or variable gain setting. The gain setting may be any value, for example, between 1 dB and 50 dB. In some implementations, high-speed interface module 106 automatically adjusts the gain setting based on the electrical characteristics of the received data, such as its amplitude, rise time, fall time, timing (e.g., setup/hold), frequency, and low-speed data communication protocol.

In some implementations, messages that arrive at low-speed interface module 102 are interpreted by microcontroller 104 and translated into transactions on network on-chip interface 126 via addr/data bus 114. For example, low-speed interface module 102 toggles interrupt 116 connected to microcontroller 104 in response to detecting activity on low-speed interface 124. In response to interrupt's 116 toggled state, microcontroller 104 wakes from a low-powered state and waits to receive messages from low-speed interface module 102 via addr/data bus 114. Low-speed interface module 102 sends the messages that it receives on low-speed interface 124 to microcontroller 104 via addr/data bus 114. Microcontroller 104 translates the messages into transactions and sends to high-speed interface module 106. In some implementations, microcontroller 104 converts the messages from a low-speed communication protocol to a high-speed communication protocol prior to sending the transactions to high-speed interface module 106. In some implementations, microcontroller 104 may encode the received messages with mapping instructions prior to sending the encoded messages to high-speed interface module 106. High-speed interface module 106 decodes the received data to extract the messages (at the low-speed data communication protocol) and the mapping instructions. High-speed interface module 106 uses the mapping instructions to convert the extracted messages to a high-speed data communication protocol. High-speed interface module 106 then drives the receiver of any network on-chip device (not shown) connected to network on-chip interface 126 with the high-speed data. In some implementations, messages that arrive at low-speed interface module 102 are interpreted by microcontroller 104 and translated into memory (e.g., memory 108).

High-speed interface module 106 generates an interrupt signal (e.g., interrupt 118) that ramps-up a voltage from a minimum voltage level to a maximum voltage level to cause microcontroller 104 to change state, such as waking from a power-saving mode (e.g., sleep mode) or transition from an idle state to an active state. In some implementations, high-speed interface module 106 generates an interrupt signal (e.g., interrupt 118) that ramps down a voltage from a maximum voltage level to a minimum voltage level to cause microcontroller 104 to change state. In some implementations, high-speed interface module 106 may generate a digital voltage. For example, high-speed interface module 106 may increase the voltage of interrupt 118 in fixed step sizes and for a fixed number of steps until interrupt 118 reaches a maximum voltage step, at which point, high-speed interface module 106 holds the voltage of interrupt 118 at the maximum voltage for a predetermined duration (e.g., any time between 1 picosecond and 100 milliseconds) and then drops the voltage of interrupt 118 back to the minimum voltage level. In some implementations, high-speed interface module 106 toggles or inverts the voltage of interrupt 118 from a low-voltage to a high-voltage. In some implementations, high-speed interface module 106 toggles or inverts the voltage of interrupt 118 from a high-voltage to a low-voltage. High-speed interface module 106 may step up or step down the voltage in any number of voltage steps, for example, any number of steps between 1 and 10. A voltage step may equal to any amount of increasing or decreasing voltage, for example, any voltage between 1 millivolt and 5.0 Volt. High-speed interface module 106 may generate a sawtooth wave, a triangular wave, a step, a pulse, or pulse train.

High-speed interface module 106 generates interrupt 118 based on activity detected on network on-chip interface 126. For example, an increase in voltage above a predetermined voltage level on any of the clock and data pins of network on-chip interface 126 may trigger high-speed interface module 106 to generate interrupt 118. In some implementations, a decrease in voltage below a predetermined voltage level on any of the clock and data pins of network on-chip interface 126 may trigger high-speed interface module 106 to generate interrupt 118. In some implementations, high-speed interface module 106 may poll an internal register to determine if a flag is set, indicating activity on network on-chip interface 126. In some implementations, high-speed interface module 106 generates an interrupt for activity detected on network on-chip interface 126 occurring after high-speed interface module 106 is configured for a particular high-speed data communication protocol. In some implementations, high-speed interface module 106 generates interrupt 118 based on determining that an instruction received on network on-chip interface 126 is specific to the current interface type. For example, a peripheral device having its I2C interface connected to network on-chip interface 126 may send a READ instruction to network on-chip interface 126. In response to determining that the READ instruction is a member of the instruction set supported by the I2C communication protocol, high-speed interface module 106 may transmit interrupt 118 to microcontroller 104 to cause microcontroller 104 to wake from its sleep and process the READ instruction. Conversely, if high-speed interface module 106 determines that the READ instruction is not a member of the instruction set supported by the I2C communication protocol, then high-speed interface module 106 does not send interrupt 118 to microcontroller 104.

High-speed interface module 106 receives configuration instructions from microcontroller 104 via a bidirectional address/data bus (e.g., addr/data bus 114). The configuration instructions may configure high-speed interface module 106 for a particular high-speed data communication protocol (also referred to as high-speed communication protocol). High-speed interface module 106 may be configured to support any high-speed data communication protocol, including, in a non-limiting example, Advanced Microcontroller Bus Architecture (AMBA) Advanced System Bus (ASB), AMBA Advanced Peripheral Bus (APB), AMBA High-Performance Bus (AHB), AHB-Lite, AMBA AXI3, AMBA AXI4, AMBA Advanced Trace Bus (ATB), AMBA ACE, AMBA Coherent Hub Interface (CHI), Open Core Protocol (OCP), Universal Serial Bus (USB), a memory mapped interface, universal asynchronous receiver/transmitter (UART), RS-232, RS-422, RS-485, Inter-Integrated Circuit (I2C), Serial Peripheral Interface (SPI), General-Purpose Input/Output (GPIO), Low Voltage Differential Signaling (LVDS), Emitter Coupled Logic (ECL), Current-Mode Logic (CIVIL), Transistor-Transistor Logic (TTL), High-Speed Transceiver Logic (HSTL), Stub Series Terminated Logic (SSTL), media-independent interface (MII), Management Data Input/Output (MDIO), Wiegand, etc.

To support the high-speed data communication protocol indicated by the configuration instructions, high-speed interface module 106 may configure its network on-chip interface 126 to include any number of the clock and data pins. For example, high-speed interface module 106 may configure network on-chip interface 126 to include a single data pin or multiple data pins that are each timed based on a single clock or multiple clocks. In some implementations, high-speed interface module 106 may configure network on-chip interface 126 as a synchronous interface (i.e., timed based on clock cycle). In some implementations, high-speed interface module 106 may configure network on-chip interface 126 as an asynchronous interface (i.e., not timed based on a clock cycle); as such, network on-chip interface 126 may include a clock data recovery unit (not shown) that generates a clock based on the incoming data. In some implementations, high-speed interface module 106 may configure network on-chip interface 126 as a serial interface or a parallel interface.

High-speed interface module 106 configures its network on-chip interface 126 based on the received configuration instructions. Network on-chip interface 126 may include an internal, dedicated resistor (not shown) having a first terminal connected to each clock and data pin of network on-chip interface 126. High-speed interface module 106 may independently configure each resistor into one of three states. In the first state, high-speed interface module 106 connects the second terminal of any of the resistors to the positive power supply (e.g., VCC) of interface adapter 100 to form a "pull-up" resistor. A pull-up resistor holds the logic signal on the associated data pin at a high logic level. In the second state, high-speed interface module 106 connects the second terminal of any of the resistors to the negative power supply (e.g., VSS) of interface adapter 100 to form a "pull-down"

resistor. This configuration holds the logic signal on the associated data pin at a low logic level. In the third state, high-speed interface module 106 disconnects the second terminal of any of the resistors to form a "floating" resistor. A floating resistor results in a high-impedance state for the associated data pin. High-speed interface module 106 may configure network on-chip interface 126 to support a particular communication protocol indicated by the configuration instructions by configuring each internal resistor into one of these three states. For example, high-speed interface module 106 may receive configuration instructions to configure network on-chip interface 126 as an AXI interface. In response to receiving the configuration instructions, high-speed interface module 106 may configure 12 pins of network on-chip interface 126 as parallel data (e.g., TDATA [11:0]), configure one pin as a clock (e.g., ACLK), configure one pin as TVALID, and configure the resistors associated with the remaining pins of network on-chip interface 126 into any of the three states described herein. In some implementations, high-speed interface module 106 may disable a pin of network on-chip interface 126 by, for example, disabling power to the pin, configuring the pin into one of the three states described here, or ignoring information received on the pin.

High-speed interface module 106 receives configuration instructions from microcontroller 104 upon power-up of microcontroller 104. For example, upon power-up, microcontroller 104 may send configuration instructions to high-speed interface module 106 to effectuate configuration of network on-chip interface 126 for a particular high-speed data communication protocol. In some implementations, high-speed interface module 106 may receive configuration instructions from microcontroller 104 after a predetermined amount of time (e.g., any time value equal to or between 1 picosecond and 5 seconds) after power-up of microcontroller 104. In some implementations, high-speed interface module 106 may receive configuration instructions from an external computing device (e.g., a microcontroller, a microprocessor, etc.) that resides outside of interface adapter 100. In some implementations, high-speed interface module 106 may be configured based on reading default settings stored in memory. For example, high-speed interface module 106 may power-up and read default settings stored in internal memory (not shown) housed within high-speed interface module 106 and configure itself based on the default settings. The default settings may configure the interface for any one of the supported interface types described herein. In some implementations, high-speed interface module 106 may receive configuration instructions from microcontroller 104 in response to sending a request to microcontroller 104 for configuration instructions. For example, high-speed interface module 106 may determine the interface type of a network on-chip device (not shown) connected to its network on-chip interface 126 and send a request to microcontroller 104 to request the interface instructions for the determined interface type. The request may include any information that microcontroller 104 may use to construct the configuration instructions, such as the interface type, characteristics about the data (e.g., data rate, amplitude, rise time, fall time, duty cycle, transition density, timing, etc.), and the number of clock and data pins.

High-speed interface module 106 may send any number of requests for configuration instructions to microcontroller 104. In some implementations, each request comprises the same information. For example, high-speed interface module 106 may send a first request for configuration instructions to configure network on-chip interface 126 for AXI communication and a second request for the same configuration instructions to configure network on-chip interface 126 for AXI communication. In some implementations, some or all of the requests comprise different information. For example, high-speed interface module 106 may send a first request for configuration instructions to configure network on-chip interface 126 for AXI communication and a second request for configuration instructions to configure network on-chip interface 126 for AHB communication (i.e., a different high-speed communication protocol).

High-speed interface module 106 may determine the interface type of the high-speed peripheral device connected to its network on-chip interface 126 by capturing data from network on-chip interface 126 and decoding the captured data to identify information unique to a particular interface type. In some implementations, high-speed interface module 106 may determine the interface type based the electrical characteristics (e.g., number of data signals, number of clock signals, minimum voltage level, maximum voltage level, amplitude, data rate, rise time, fall time, dc bias voltage, capacitive load, output impedance) of the high-speed peripheral device connected to network on-chip interface 126. In some implementations, high-speed interface module 106 may determine the interface type based on determining the circuit topology (e.g., open collector/open-drain, open-emitter/open-source) of the receiver and/or transmitter of the high-speed peripheral device connected to its network on-chip interface 126. For example, high-speed interface module 106 may determine that the network on-chip interface 126 is connected to the open collector/open-drain of the high-speed peripheral device; in response, high-speed interface module 106 may determine the interface type as I2C.

High-speed interface module 106 may determine the interface type in response to the occurrence of a triggering event, such as, the power-up of interface adapter 100, the elapse of a predetermined amount of time (e.g., any time value equal to or between 1 picosecond and 5 seconds) after the power-up of microcontroller 104, the receipt of a request from microcontroller 104 for the interface type, upon the detection of activity on network on-chip interface 126 by high-speed interface module 106.

In some implementations, microcontroller 104 may determine the interface type of network on-chip interface 126 by using any of the same methods high-speed module 106 may use to determine the interface type. For example, upon power-up, microcontroller 104 may determine that network on-chip interface 126 is connected to an I2C interface by determining that network on-chip interface 126 is connected to the open-collector of a high-speed peripheral device.

In some implementations, interface adapter 100 may translate data from a high-speed data communication protocol to a low-speed data communication protocol, such that the process, as described above, reverses. In this instance, high-speed interface module 106 receives mapping instructions from microcontroller 104 to effectuate a conversion or mapping of data from a high-speed data communication protocol to a low-speed communication protocol. For example, high-speed interface module 106 may receive AXI data on its network on-chip interface 126. In response, high-speed interface module 106 may toggling interrupt 118 to wake microcontroller 104 from a low-power sleep mode. Once awake, microcontroller 104 may send mapping instructions to high-speed interface module 106 specific to mapping high-rate AXI data to low-rate APB data. High-speed interface module 106 may then generate APB data on transaction bus 112 from the AXI data on its network on-chip interface 126 based on the received mapping instructions. In some implementations, high-speed interface module 106 may generate encoded data on transaction bus 112 that matches the same high-speed data communication protocol of the data on high-speed interface module 106. For example, high-speed interface module 106 may receive AXI data on its network on-chip interface 126 and toggle interrupt 118 to cause microcontroller 104 to send AXI to APB mapping instructions to high-speed interface module 106. High-speed interface module 106 encodes the AXI data with the received mapping instructions to generate encoded AXI data and sends the encoded data to a low-speed interface module 102 via transaction bus 112. Low-speed interface module 102 decodes the received data to extract the AXI data and the mapping instructions. Low-speed interface module 102 uses the mapping instructions to convert the extracted AXI data to APB data. Low-speed interface module 102 then drives the receiver of any low-speed peripheral device (not shown) connected to low-speed interface 124 with the APB data.

High-speed interface module 106 receives mapping instructions from microcontroller 104 in response to microcontroller's 104 receipt of interrupt 118. For example, high-speed interface module 106 sends interrupt 118 to microcontroller 104 and in response, microcontroller 104 sends mapping instructions to high-speed interface module 106 causing high-speed interface module 106 to translate data on its network on-chip interface 126 from one data communication protocol (e.g., AXI) to another data communication protocol (e.g., APB). High-speed interface module 106 receives mapping instructions upon power-up of microcontroller 104. For example, upon power-up, microcontroller 104 may send configuration instructions, mapping instructions, or both to high-speed interface module 106. In some implementations, high-speed interface module 106 may receive mapping instructions from microcontroller 104 after a predetermined amount of time (e.g., any time value equal to or between 1 picosecond and 5 seconds) after power-up of microcontroller 104. In some implementations, high-speed interface module 106 may receive mapping instructions from an external computing device (e.g., a microcontroller, a microprocessor) that resides outside of interface adapter 100. In some implementations, high-speed interface module 106 may be read default mapping instructions stored in memory. For example, high-speed interface module 106 may power-up and read default mapping settings stored in internal memory (not shown) housed within high-speed interface module 106 that describe the procedure for mapping AXI to APB. In some implementations, high-speed interface module 106 may receive mapping instructions from microcontroller 104 in response to sending a request to microcontroller 104 for mapping instructions. The request may include any information that microcontroller 104 may use to construct the mapping instructions, such as the interface type, characteristics about the data (e.g., data rate, amplitude, rise time, fall time, duty cycle, transition density), the number of clock and data pins, a low-speed data communication protocol associated with low-speed interface 124, and a high-speed data communication protocol associated with network on-chip interface 126. In some implementation, high-speed interface module 106 receives mapping instructions from microcontroller 104 in response to microcontroller's 104 receipt of an interrupt (e.g., interrupt 116) from low-speed interface module 102.

In some implementations, high-speed interface module 106 receives mapping instructions from microcontroller 104 without sending interrupt 118 to microcontroller 104. In some implementations, high-speed interface module 106 sends a notification to an external computing device (e.g., a microcontroller, a microprocessor) that resides outside of interface adapter 100 to indicate that data has arrived on network on-chip interface 126. In turn, the external computing device toggles an interrupt signal (e.g., interrupt 118) to microcontroller 104 causing microcontroller 104 to send mapping instructions to high-speed interface module 106.

Low-speed interface module 102 receives transaction data from high-speed interface module 106 via a transaction bus (e.g., transaction bus 112) and drives the received transaction data to an external low-speed peripheral device (not shown) connected to low-speed interface 124 of interface adapter 100. The data rate of the transaction data received by low-speed interface module 102 may be equal to or less than the data rate of the data carried on network on-chip interface 126. For example, network on-chip interface 126 may carry AXI data, while transaction bus 112 may carry APB data. In another example, network on-chip interface 126 may carry APB data at a first data rate and transaction bus 112 may carry APB data at a second data rate, where first data rate is higher than second data rate. Low-speed interface module 102 generates data on low-speed interface 124 that operates at a lower data rate than the data carried on network on-chip interface 126. For example, network on-chip interface 126 may carry AXI data, while low-speed interface 124 may carry I2C data. In some implementations, low-speed interface module 102 may boost the amplitude or power of the data received on transaction bus 112 via a fixed or variable gain setting. The gain setting may be any value, for example, between 1 dB and 50 dB. In some implementations, low-speed interface module 102 automatically adjusts the gain setting based on the electrical characteristics of the received data, such as its amplitude, rise time, fall time, timing (e.g., setup/hold), frequency, and high-speed data communication protocol.

In some implementations, messages that arrive at high-speed interface module 106 are interpreted by microcontroller 104 and translated into transactions on low-speed interface 124 via addr/data bus 114. For example, high-speed interface module 106 toggles interrupt 118 connected to microcontroller 104 in response to detecting activity on network on-chip interface 126. In response to interrupt's 118 toggled state, microcontroller 104 wakes from a low-powered state and waits to receive messages from high-speed interface module 106 via addr/data bus 114. High-speed interface module 106 sends the messages that it receives on network on-chip interface 126 to microcontroller 104 via addr/data bus 114. Microcontroller 104 translates the messages into transactions and sends to low-speed interface module 102. In some implementations, microcontroller 104 converts the messages from a high-speed communication protocol to a low-speed communication protocol prior to sending the transactions to low-speed interface module 102. In some implementations, microcontroller 104 may encode the received messages with mapping instructions prior to sending the encoded messages to low-speed interface module 102. Low-speed interface module 102 decodes the received data to extract the messages (at the high-speed data communication protocol) and the mapping instructions. Low-speed interface module 102 uses the mapping instructions to convert the extracted messages to a low-speed data communication protocol. Low-speed interface module 102 then drives the receiver of any low-speed peripheral device (not shown) connected to low-speed interface 124 with the low-speed data. In some implementations, messages that arrive at high-speed interface module 106 are interpreted by microcontroller 104 and translated into memory (e.g., memory 108).

Microcontroller 104 may be a microcontroller of any bit size. In a non-limiting example, microcontroller 104 may be an 8-bit microcontroller, a 16 bit microcontroller, a 32 bit microcontroller, a 64 bit-microcontroller, or a 128 bit microcontroller. Microcontroller 104 may be a microcontroller of any memory type. In a non-limiting example, microcontroller 104 may be an external memory microcontroller, such that microcontroller 104 reads and writes instructions to memory external to microcontroller 104. In another non-limiting example, microcontroller 104 may be an embedded memory microcontroller, such that microcontroller 104 reads and writes instructions to memory embedded or internal to microcontroller 104. Microcontroller 104 may comprise any memory architecture. In a non-limiting example, microcontroller 104 may comprise a Harvard memory architecture or Princeton memory architecture. Microcontroller 104 may use any type of instruction set. In a non-limiting example, microcontroller 104 may use a complex instruction set computer (CISC) instruction set permitting the use of a single instruction as an alternative to many simple instructions. In another non-limiting example, microcontroller 104 may use a Reduced Instruction Set Computer (RISC) instruction set, which reduces the operation time by shortening the clock cycle per instruction. In some implementations, microcontroller 104 may be microprocessor.

Microcontroller 104 sends configuration instructions to low-speed interface module 102 to configure low-speed interface module 102 for any of the low-speed data communication protocols described herein. For example, upon power-up and/or exiting of a RESET state, microcontroller 104 fetches and executes program code (e.g., "default settings" as described herein) stored in memory at an initial address (e.g., 0x0) to configure low-speed interface module 102 for a particular communication protocol. After configuring low-speed interface module 102 with the default settings, microcontroller 104 may enter a reduced power state (e.g., sleep, deep sleep) or an IDLE state to wait for the occurrence of an interrupt (e.g., interrupt 116). When interrupt 116 toggles state, microcontroller 104 wakes from the low power mode and executes the "next instruction" after the wait for interrupt (shown in FIG. 4A as "WFI") instruction. For example, if a wait for interrupt (WFI) instruction is stored at address 0x10 and WFI instruction is a two-byte instruction, then the program counter (e.g., program counter 308 in FIG. 3) of microcontroller 104 will start accessing the instructions located at address 0x12. In some implementations, microcontroller 104 fetches the default settings for low-speed interface module 102 from instruction ROM 110. In some implementations, microcontroller 104 fetches the default settings for low-speed interface module 102 from memory 108. In some implementations, microcontroller 104 fetches the default settings for low-speed interface module 102 from microcontroller's 104 internal memory (not shown). In some implementations, the default settings for high-speed interface module 106 are hardcoded into the assembly language. For example, if the assembly language supports direct variable access, then the default settings may include constants for microcontroller 104 to configure the low-speed peripheral interface.

The "next instruction" (as discussed above) after the WFI instruction is a Jump to Subroutine (shown in FIG. 4 as "JSR") instruction. The execution of this instruction by microcontroller 104 causes microcontroller 104 to jump to the address location for a subroutine and execute that subroutine. The execution of the subroutine by microcontroller 104 causes microcontroller 104 to send mapping instructions to low-speed interface module 102 to effectuate a conversion or mapping of data from a low-speed data communication protocol to a high-speed communication protocol. Accordingly, messages that arrive at low-speed interface module 102 via low-speed interface 124 are interpreted by the microcontroller 104 and translated into I/O transactions across transaction bus 112. In some implementations, messages that arrive at low-speed interface module 102 via low-speed interface 124 are interpreted by the microcontroller 104 and translated into memory (e.g., memory 108) via memory bus 120.

In some implementations, the execution of the subroutine by microcontroller 104 causes microcontroller 104 to send mapping instructions to high-speed interface module 106 to effectuate a conversion or mapping of data from a high-speed data communication protocol to a low-speed communication protocol. Accordingly, messages that arrive at high-speed interface module 106 via network on-chip interface 126 are interpreted by the microcontroller 104 and translated into input/output (I/O) transactions across transaction bus 112. In some implementations, messages that arrive at high-speed interface module 106 via network on-chip interface 126 are interpreted by the microcontroller 104 and translated into memory (e.g., memory 108) via memory bus 120.

Microcontroller 104 detects a toggled state on an interrupt when the interrupt transitions from a low-voltage state to a high-voltage state. For example, microcontroller 104 may detect that an interrupt (e.g., interrupt 116, interrupt 118) transitions from a low-voltage state to a high-voltage state when the voltage of the interrupt increases above a predetermined voltage threshold, such as, any particular voltage between the range of 1 millivolt and 5.0 volt. In some implementations, microcontroller 104 may detect a toggled state on an interrupt (e.g., interrupt 116, interrupt 118) when the interrupt transitions from a high-voltage state to a low-voltage state. For example, microcontroller 104 may detect that an interrupt (e.g., interrupt 116, interrupt 118) transitions from a high-voltage state to a low-voltage state when the voltage of the interrupt decreases below the predetermined voltage threshold.

Microcontroller 104 sends configuration instructions to high-speed interface module 106 to configure high-speed interface module 106 for any of the high-speed data communication protocols described herein. For example, upon power-up and/or exiting of a RESET state, microcontroller 104 fetches and executes program code (e.g., "default settings" as described herein) stored in memory at address 0x0 to configure high-speed interface module 106 for a particular communication protocol. After configuring high-speed interface module 106 with the default settings, microcontroller 104 may enter a reduced power state (e.g., sleep, deep sleep) or an IDLE state to wait for the occurrence of an interrupt (e.g., interrupt 116). When interrupt 116 toggles state, microcontroller 104 wakes from the low power mode and executes the next instruction after the wait for interrupt (WFI) instruction (shown in FIG. 4). In some implementations, microcontroller 104 fetches the default settings for high-speed interface module 106 from instruction ROM 110. In some implementations, microcontroller 104 fetches the default settings for high-speed interface module 106 from memory 108. In some implementations, microcontroller 104 fetches the default settings for high-speed interface module 106 from microcontroller's 104 internal memory (not shown). In some implementations, the default settings for high-speed interface module 106 are hardcoded into the assembly language. For example, if the assembly language supports direct variable access, then the default settings may include constants for microcontroller 104 to configure the low-speed peripheral interface.

Microcontroller 104 may send configuration instructions to low-speed interface module 102 and/or high-speed interface module 106 in response to the occurrence of a triggering event, such as, the power-up of microcontroller 104, microcontroller's 104 exit from a RESET state, the elapse of a predetermined amount of time (e.g., any time value equal to or between 1 picosecond and 5 seconds) after the power-up of microcontroller 104, receipt of a request from low-speed interface module 102 for configuration instructions, receipt of a request from high-speed interface module 106 for configuration instructions, or receiving a notification message from a device directly or indirectly connected to interface adapter 100, such as a low-speed peripheral device (not shown) and a network on-chip device (not shown). As discussed herein, microcontroller 104 may receive any number of requests for configuration instructions from low-speed interface module 102 and/or high-speed interface module 106. In some implementations, microcontroller 104 may send a request to low-speed interface 102 requesting the interface type of low-speed interface 124. In some implementations, microcontroller 104 may send a request to high-speed interface module 106 requesting the interface type of network on-chip interface 126.

Figure 2:
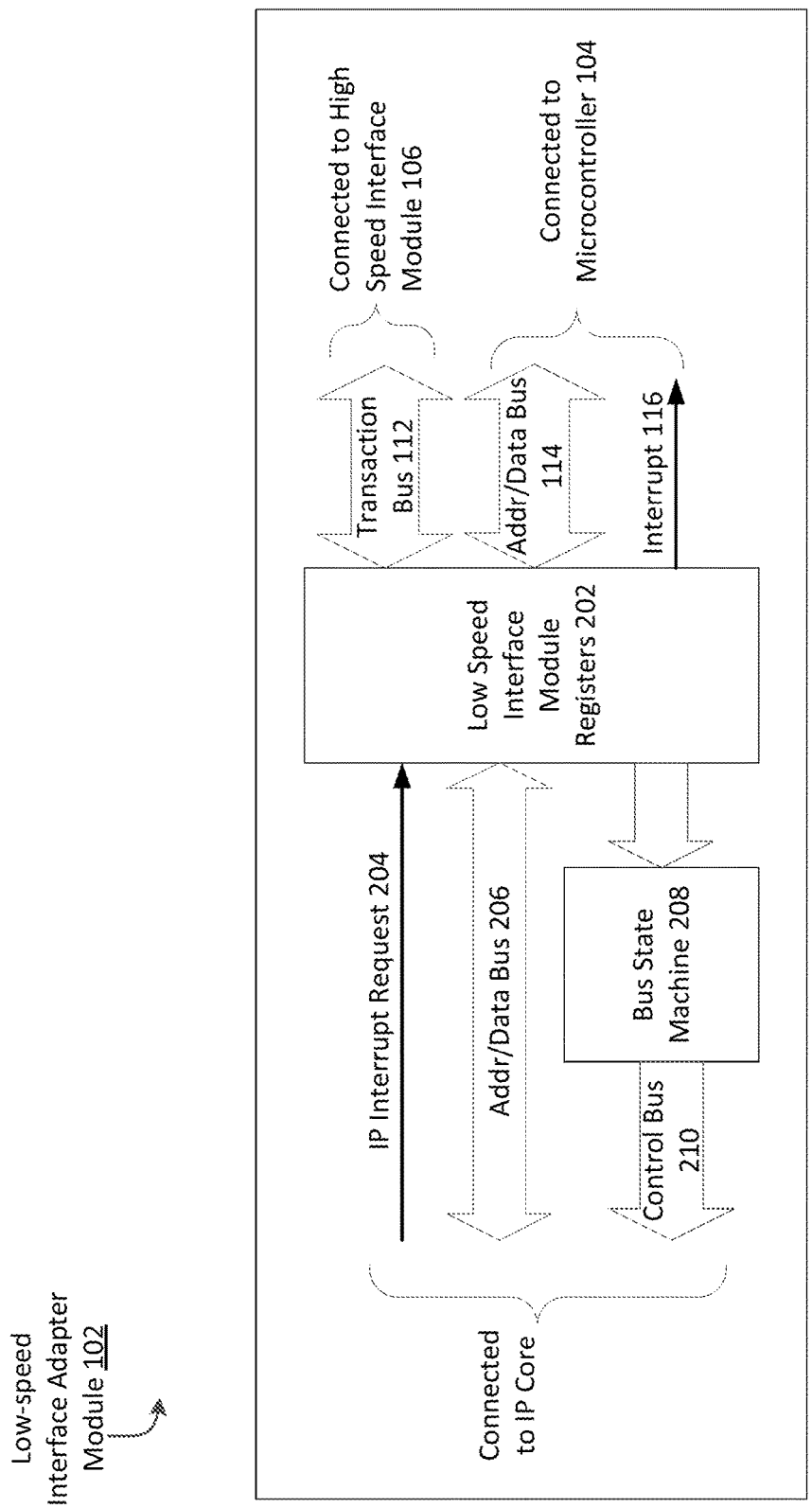
FIG. 2 is a block diagram depicting a low-speed interface module 102 for adapting communication between a low-speed interface and a high-speed interface, in accordance with an illustrative implementation.

FIG. 2 is a block diagram depicting a low-speed interface module 102 for adapting communication between a low-speed interface (e.g., low-speed interface 124) and a high-speed interface (e.g., network on-chip interface 126), in accordance with an illustrative implementation. Low-speed interface module 102 includes low-speed interface module registers 202 and a bus state machine 208. In some implementations, low-speed interface module 102 may include fewer, additional, and/or different components. An input terminal of low-speed interface module registers 202 connects to an intellectual property (IP) core (not shown) to receive IP interrupt request 204. A first bi-directional terminal (e.g., addr/data bus 114) of low-speed interface module registers 202 connects to the IP Core to send and receive address/data instructions. A first output terminal of low-speed interface module registers 202 connects to an input terminal of bus state machine 208, whose output terminal (e.g., control bus 210) connects to the IP Core to send control bus instructions. A second bi-directional terminal (e.g., transaction bus 112) of low-speed interface module registers 202 connects to a third bi-directional terminal of high-speed interface module 106 (as shown in FIG. 1) to send and receive transaction data. A third bi-directional terminal (e.g., addr/data bus 114) of low-speed interface module registers 202 connects to a third bi-directional terminal of microcontroller 104 (as shown in FIG. 1) to send and receive address/data instructions.

Low-speed interface module registers 202 are a consistent set of registers that low-speed interface module 102 uses to hold transaction information. In some implementations, the transaction information is independent of the peripheral interface (e.g., low-speed interface 124). In some implementations, the transaction information is dependent on the peripheral interface. Likewise, high speed interface module 106 of FIG. 1 contains control, address, and data registers (not shown) that high-speed interface module 106 may use to control network on-chip interface 126 as configured for a particular high-speed communication protocol. However, the functionality of the state machine (e.g., bus state machine 208) within each module depends on the interface type or low-speed/high-speed communication protocol. In some implementations, the functionality of the state machine (e.g., bus state machine 208) within each module does not depend on the interface type or low-speed/high-speed communication protocol. In some implementations, configuration instructions modify low-speed interface module registers 202 for a particular low-speed communication protocol. In some implementations, low-speed interface module registers 202 may be modified or updated by instructions (e.g., configuration instructions, mapping instructions) sent from microcontroller 104 to allow low-speed interface module 102 to control low-speed interface 124 for a particular low-speed communication protocol. In some implementations, high-speed interface module registers (not shown) may be modified or updated by instructions (e.g., configuration instructions, mapping instructions) sent from microcontroller 104 to allow high-speed interface module 106 to control network on-chip interface 126 for a particular high-speed communication protocol.

Figure 3:
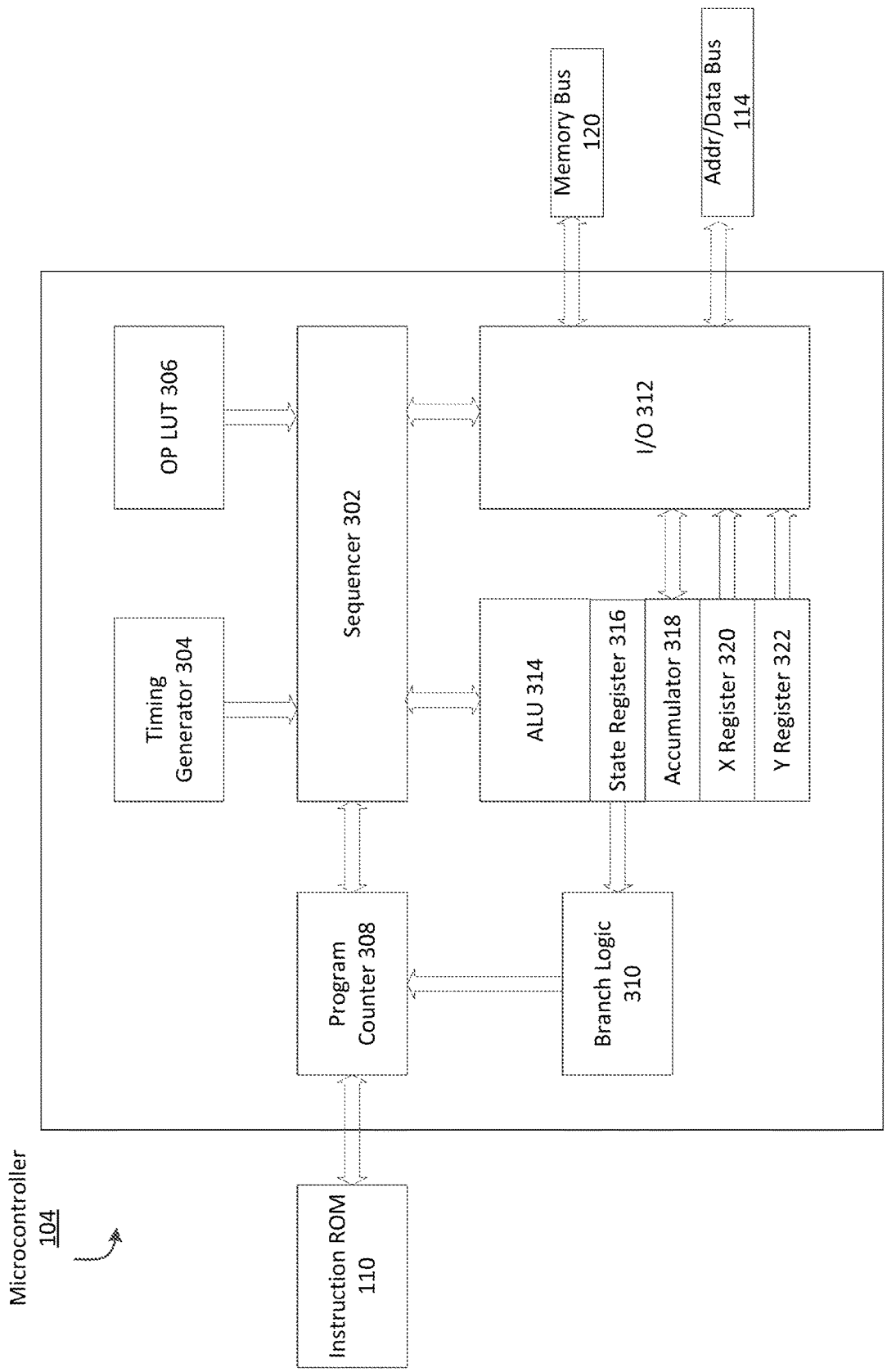
FIG. 3 is a block diagram depicting a microcontroller 104 for adapting communication between a low-speed interface and a high-speed interface, in accordance with an illustrative implementation.

FIG. 3 is a block diagram depicting a microcontroller 104 for adapting communication between a low-speed interface (e.g., low-speed interface 124) and a high-speed interface (e.g., network on-chip interface 126), in accordance with an illustrative implementation. Microcontroller 104 includes a micro-sequencer (shown as sequencer 302), a timing generator 304, a program counter 308, branch logic 310, an arithmetic-logic unit (shown as ALU 314), a state register 316, an accumulator 318, an X register 320, a Y register 322, an operations look-up table (shown as OP LUT 306), and an Input/Output block (shown as I/O 312). As shown, instruction ROM 110 resides outside of microcontroller 104. In some implementations, instruction ROM 110 is housed within microcontroller 104. In another implementation, microcontroller 104 may include fewer, additional, and/or different components.

A first input terminal of sequencer 302 connects to an output terminal of timing generator 304. A second input terminal of sequencer 302 connects to an output terminal of OP LUT 306. A first bi-directional terminal of sequencer 302 connects to a first bidirectional terminal of program counter 308. A second bi-directional terminal of sequencer 302 connects to a first bidirectional terminal of ALU 314, which has connections (not shown) to state register 316, accumulator 318, X register 320, and Y register 322. A third bi-directional terminal of sequencer 302 connects to a first bidirectional terminal of I/O 312. A second bidirectional terminal of program counter 308 connects to a first bidirectional terminal of instruction ROM 110. An input terminal of program counter 308 connects to an output terminal of branch logic 310. A second bi-directional terminal (e.g., memory bus 120) of I/O 312 connects to a first bi-directional terminal of memory 108 (as shown in FIG. 1). A third bi-directional terminal (e.g., addr/data bus 114) of I/O 312 connects to a second bi-directional terminal of low-speed interface module 102 (as shown in FIG. 1) and a second bi-directional terminal of high-speed interface module 106 (as shown in FIG. 1). A fourth bi-directional terminal of I/O 312 connects to a bi-directional terminal of accumulator 318. A first input terminal of I/O 312 connects to a first output terminal of X register 320 and a second input terminal of I/O 312 connects to a first output terminal of Y register 322.

As shown in FIG. 3, microcontroller 104 adapts communication between a low-speed interface (e.g., low-speed interface 124) and a high-speed interface (network on-chip interface 126) via instruction ROM 110, memory bus 120, and addr/data bus 114. Program instructions (e.g., configuration instructions, mapping instructions) sent by microcontroller 104 across either of the buses may be any byte length, for example, 1 byte, 2 bytes, 4 bytes, 8 bytes, 16 bytes, 32 bytes, or 64 bytes. Program counter 308 maintains a pointer to the program instruction currently being executed by microcontroller 104. All program instructions, regardless of their length, take 4 clock cycles to complete, which comprises one machine cycle. In some implementations, all program instructions may take any number of clock cycles to complete, for example, any clock cycle in the range of 1 to 10 clock cycles. All internal operations are synced to one of the clock cycles (e.g., to one of the 4 clock cycles) in the machine cycle as orchestrated by timing generator 304 and executed by the outputs of the OP LUT 306. Timing generator 304 and OP LUT 306 form sequencer 302. In some implementations, sequencer 302 may be a microsequencer. In some implementations, sequencer 302 generates the addresses used to step through the microprogram of a control store.

ALU 314 implements addition, subtraction, logical shift operations, and Boolean logic operations, and has three target outputs: X register 320, Y register 322, and accumulator 318. State register 316 consists of a Zero Detected bit, which is set whenever accumulator 318 contains a value of zero as a result of executing an instruction. Branch instructions may test this bit to conditionally perform a jump (shown in FIG. 4 as "JSR") to another bit location (e.g., another 8 bit location) within instruction ROM 110. In some implementations, unconditional absolute branch instructions are supported. A Wait for Interrupt instruction (shown in FIG. 4 as "WFI") provides the ability for microcontroller 104 to enter a low-power state when it is not performing its interface operations. In a non-limiting example, ALU 314 may be an 8-bit ALU, a 16-bit ALU, a 32-bit ALU, a 64-bit ALU, and a 128-bit ALU.

Microcontroller 104 is driven by sequencer 302, which provides the control signals to drive most of microcontroller's 104 internal functions. These control outputs come directly from the OP LUT 306. The operation (OP) code currently stored in the program counter 308 indexes OP LUT 306. In a non-limiting example, the outputs of OP LUT 306 may include the following controls:
  (1) address mode of the instruction
  (2) branch mode of the instruction
  (3) bytes per instruction
  (4) ALU input source select
  (5) ALU input register select
  (6) ALU OP code
  (7) ALU target register select To program microcontroller 104, an assembly language program file may be generated. FIG. 4 is a table 400 depicting instructions and assembly language references that microcontroller 104 may execute when adapting communication between a low-speed interface and a high-speed interface, in accordance with an illustrative implementation. The OP Code (shown in the OP Code column of FIG. 4) is the numeric value assigned to the instruction. Although shown as a specific value (e.g., 0x00, 0x01, 0x02, etc.), the value of the OP Code in each of the rows of the table in FIG. 4 may be any hex value, for example, in the range of 0x00 and 0x15. The Z column represents how the "Zero Detect Bit" in State Register 316 is affected by the instruction.

Once generated, the assembly language program reads the assembly source file and produces a Verilog source file containing an implementation of the instruction ROM, which is stored in instruction ROM 110. In some implementations, the assembly language program produces a source file using any hardware description language (e.g., very high-speed hardware description language (VHDL), Verilog, etc.) or programming language (e.g., C, C++, C#, Java, Perl, TCL, Python, etc.). When the program is properly implemented, the program begins its autonomous control of interface adapter 100 by executing the instruction at address 0.

FIG. 5A is a flow diagram depicting a process 500A for adapting communication from a low-speed interface to a high-speed interface, in accordance with an illustrative implementation. Additional, fewer, or different operations may be performed depending on the implementation of the process. The process 500A may be implemented by a system such as interface adapter 100 of FIG. 1. At operation 502A, interface adapter 100 powers up and microcontroller 104 exits RESET. At operation 504A, microcontroller 104 fetches and executes program code from instruction ROM 110 at an initial memory address location (e.g., 0x0) causing microcontroller 104 to proceed to operation 506A. At operation 506A, microcontroller 104 retrieves default configuration instructions for a particular low-speed communication protocol from memory (e.g., instruction ROM 110, memory 108, memory internal to microcontroller 104, etc.). At operation 508A, microcontroller 104 sends the default configuration instructions to low-speed interfaced module 102 to configure low-speed interface module 102 for the default low-speed communication protocol. At operation 510A, microcontroller 104 enters a low-powered state. For example, microcontroller 104 may execute a Wait For Interrupt (WFI) instruction causing microcontroller 104 to enter a low-power mode. At operation 512A, microcontroller 104 detects the status of interrupt 116. At operation 514A, microcontroller 104 determines if interrupt 116 changes or toggles state. If interrupt 116 does not change state, then microcontroller 104 proceeds back to operation 512A; otherwise, microcontroller 104 proceeds to operation 516A to wake from the low power mode and execute a Jump to Subroutine (JSR) instruction. At operation 518A, microcontroller 104 sends mapping instructions to low-speed interface module 102 to effectuate a conversion or mapping of data from a low-speed data communication protocol to a high-speed communication protocol. At operation 520A, microcontroller 104 checks if it receives an instruction on addr/data bus 114. At operation 522A, microcontroller determines if the received instruction is a request for configuration instructions and/or mapping instructions for a second type of low-speed communication protocol (i.e., different than the default low-speed communication protocol). If the instruction is not a request for a configuration instruction and/or mapping instruction of a different type, then microcontroller 104 proceeds back to operation 520A. However, if microcontroller did receive such a request, then microcontroller 104 proceeds to operation 524A to retrieve the requested configuration and/or mapping instructions from memory. At operation 526A, microcontroller sends the requested configuration and/or mapping instructions to low-speed interface module 102 and proceeds back to operation 520A.

Figure 5B:
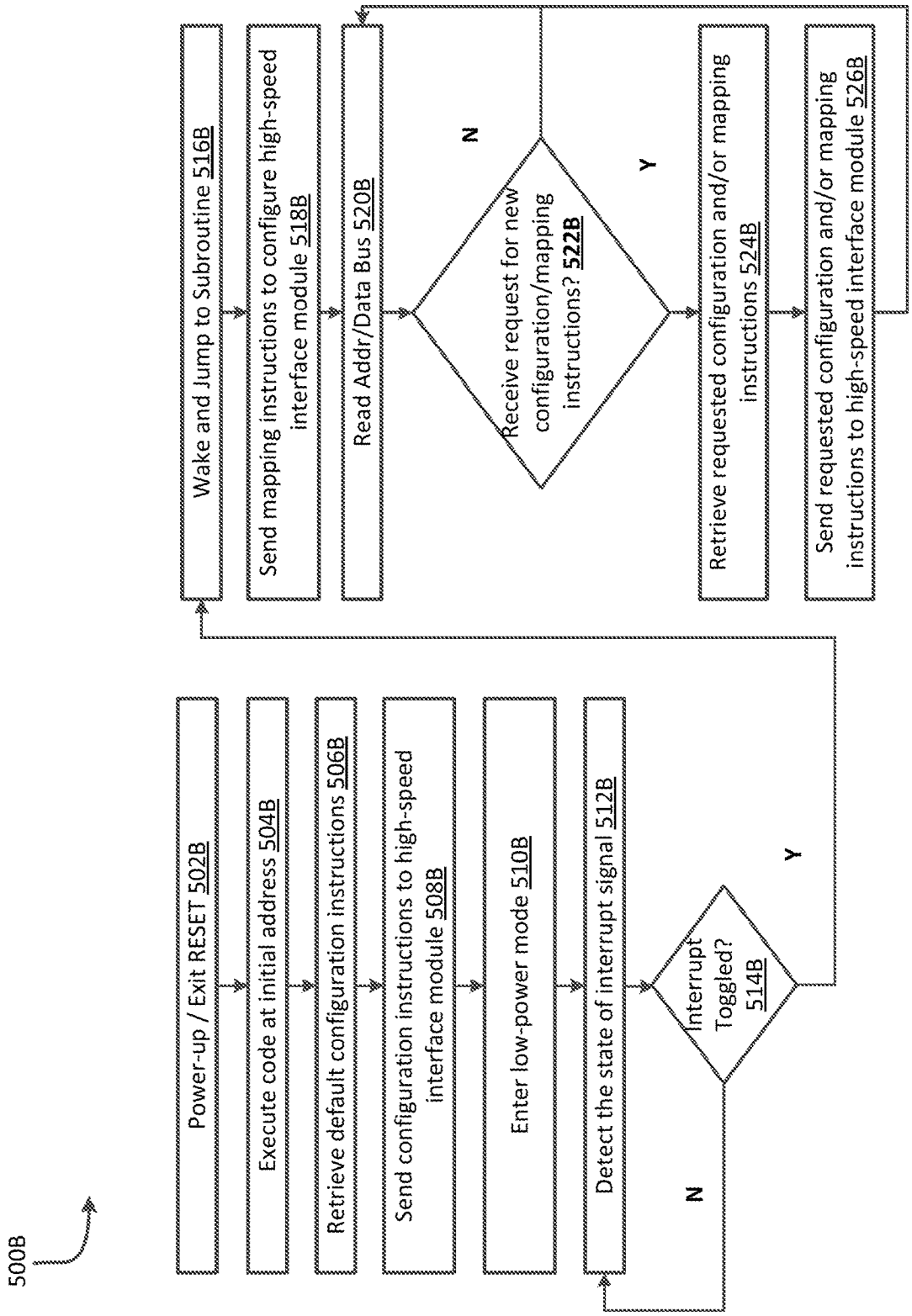
FIG. 5B is a flow diagram depicting a process 500B for adapting communication from a high-speed interface to a low-speed interface, in accordance with an illustrative implementation.

FIG. 5B is a flow diagram depicting a process 500B for adapting communication from a high-speed interface to a low-speed interface, in accordance with an illustrative implementation. Additional, fewer, or different operations may be performed depending on the implementation of the process. The process 500B may be implemented by a system such as interface adapter 100 of FIG. 1. At operation 502B, interface adapter 100 powers up and microcontroller 104 exits RESET. At operation 504B, microcontroller 104 fetches and executes program code from instruction ROM 110 at an initial memory address location (e.g., 0x0) causing microcontroller 104 to proceed to operation 506B. At operation 506B, microcontroller 104 retrieves default configuration instructions for a particular high-speed communication protocol from memory (e.g., instruction ROM 110, memory 108, memory internal to microcontroller 104, etc.). At operation 508B, microcontroller 104 sends the default configuration instructions to high-speed interfaced module 106 to configure high-speed interface module 106 for the default high-speed communication protocol. At operation 510B, microcontroller 104 enters a low-powered state. For example, microcontroller 104 may execute a Wait For Interrupt (WFI) instruction causing microcontroller 104 to enter a low-power mode. At operation 512B, microcontroller 104 detects the status of interrupt 118. At operation 514B, microcontroller 104 determines if interrupt 118 changes or toggles state. If interrupt 118 does not change state, then microcontroller 104 proceeds back to operation 512B; otherwise, microcontroller 104 proceeds to operation 516B to wake from the low power mode and execute a Jump to Subroutine (JSR) instruction. At operation 518B, microcontroller 104 sends mapping instructions to high-speed interface module 106 to effectuate a conversion or mapping of data from a high-speed data communication protocol to a low-speed communication protocol. At operation 520B, microcontroller 104 checks if it receives an instruction on addr/data bus 114. At operation 522B, microcontroller determines if the received instruction is a request for configuration instructions and/or mapping instructions for a second type of high-speed communication protocol (i.e., different than the default high-speed communication protocol). If the instruction is not a request for a configuration instruction and/or mapping instruction of a different type, then microcontroller 104 proceeds back to operation 520B. However, if microcontroller did receive such a request, then microcontroller 104 proceeds to operation 524B to retrieve the requested configuration and/or mapping instructions from memory. At operation 526B, microcontroller sends the requested configuration and/or mapping instructions to high-speed interface module 106 and proceeds back to operation 520B.

Figure 5C:
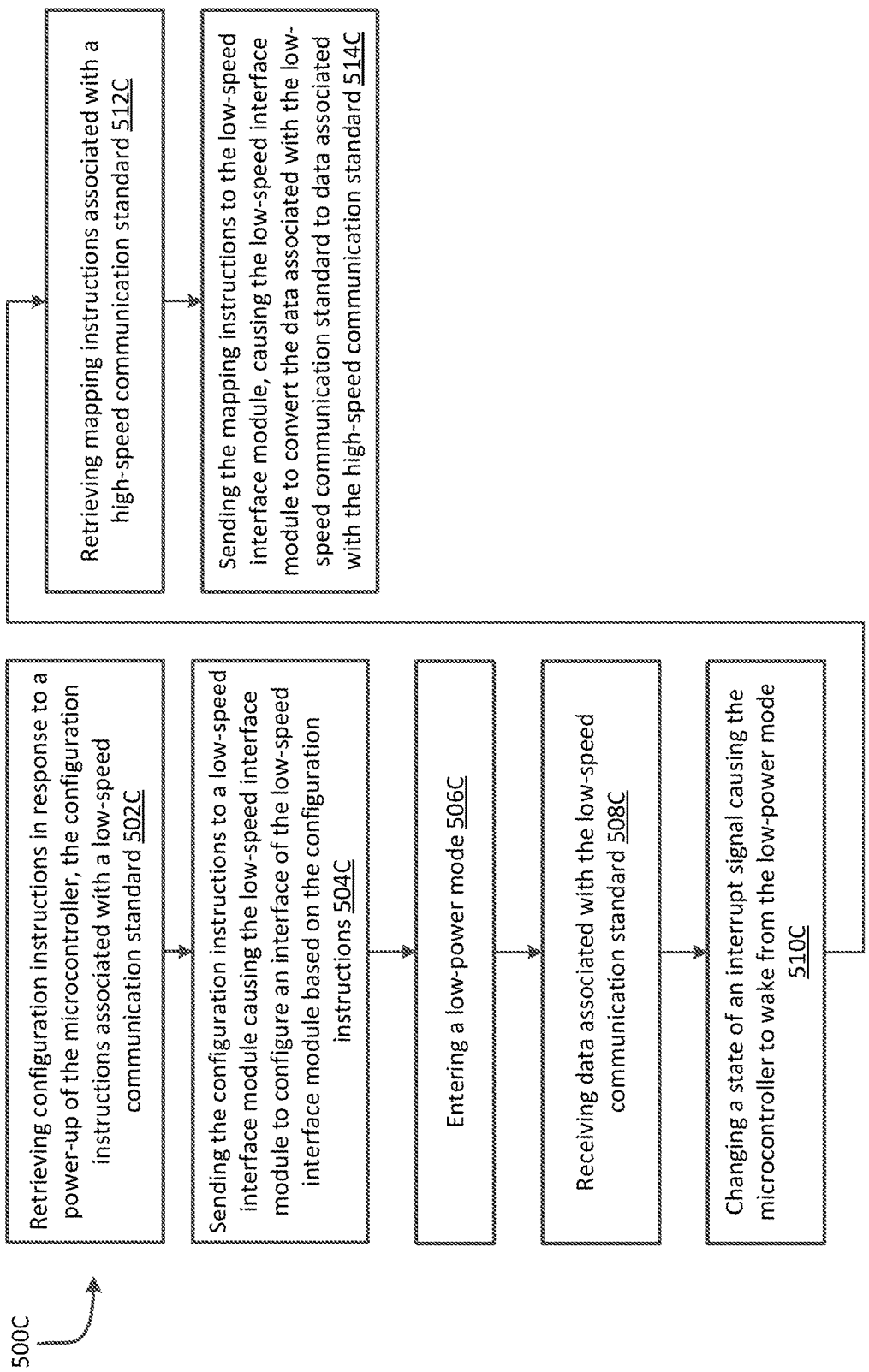
FIG. 5C is a flow diagram depicting a process 500C for adapting communication from a high-speed interface to a low-speed interface, in accordance with an illustrative implementation.

FIG. 5C is a flow diagram depicting a process 500C for adapting communication from a high-speed interface to a low-speed interface, in accordance with an illustrative implementation. Additional, fewer, or different operations may be performed depending on the implementation of the process. The process 500C may be implemented by a system such as interface adapter 100 of FIG. 1. At operation 502C, a microcontroller (e.g., microcontroller 104) retrieves—via a memory bus (e.g., memory bus 120)—configuration instructions in response to a power-up of the microcontroller. In some implementations, the configuration instructions are associated with a low-speed communication protocol. At operation 504C, the microcontroller sends—via an address/data bus (e.g., addr/data bus 114)—the configuration instructions to a low-speed interface module (e.g., low-speed interface module 102) causing the low-speed interface module to configure an interface (e.g., low-speed interface 124) of the low-speed interface module based on the configuration instructions. At operation 506C, the microcontroller enters a low-power mode. In some implementations, the low-power mode may be a sleep mode, a deep sleep mode, or an IDLE mode that consumes less power than that consumed during an ACTIVE mode. At operation 508C, the interface of the low-speed interface module receives data associated with the low-speed communication protocol. At operation 510C, the low-speed interface module changes—in response to receiving the data—a state of an interrupt signal (e.g., interrupt 116) causing the microcontroller to wake from the low-power mode. At operation 512C, the microcontroller retrieves—via an instruction bus (e.g., instruction bus 122)—mapping instructions associated with a high-speed communication protocol. At operation 514C, the microcontroller sends—via the address/data bus—the mapping instructions to the low-speed interface module, causing the low-speed interface module to convert the data associated with the low-speed communication protocol to data associated with the high-speed communication protocol.

It should be understood that implementations of the present disclosure may be used in a variety of applications. Although the present disclosure is not limited in this respect, the circuits disclosed herein may be used in many apparatuses such as in internal and external hard drives, storage devices, transmitters, receivers, and modems of a communication system, a video codec, audio equipment such as music players and microphones, a television, camera equipment, test equipment such as an oscilloscope, and medical equipment. Communication systems intended to be included within the scope of the present disclosure include, by way of example only, cellular radiotelephone communication systems, satellite communication systems, two-way radio communication systems, one-way pagers, two-way pagers, personal communication systems (PCS), personal digital assistants (PDA's) and the like.

The various implementations illustrated and described are provided merely as examples to illustrate various features of the claims. However, features shown and described with respect to any given implementation are not necessarily limited to the associated implementation and may be used or combined with other implementations that are shown and described. Further, the claims are not intended to be limited by any one example implementation.

The foregoing method descriptions and the process flow diagrams are provided merely as illustrative examples and are not intended to require or imply that the steps of various implementations must be performed in the order presented. As will be appreciated by one of skill in the art the order of steps in the foregoing implementations may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the implementations disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary implementations, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The term "coupled" disclosed in this description may encompass both direct and indirect coupling. Thus, first and second parts are said to be coupled together when they directly contact one another, as well as when the first part couples to an intermediate part which couples either directly or via one or more additional intermediate parts to the second part. The term "connects" or "connected" disclosed in this description encompasses a direct connection between components. The term "substantially" or "about" may encompass a range that is largely, but not necessarily wholly, that which is specified. It encompasses all but a significant amount. When devices or components of the delta sigma modulator are responsive to events, the actions and/or steps of devices, such as the operations that other devices are performing, necessarily occur as a direct or indirect result of the preceding events and/or actions. In other words, the operations occur as a result of the preceding operations. A device that is responsive to another requires more than an action (i.e., the device's response to) merely follow another action.

The preceding description of the disclosed implementations is provided to enable any person skilled in the art to make or use the present disclosure. Various modifications to these implementations will be readily apparent to those skilled in the art, and the generic principles defined herein may be applied to some implementations without departing from the spirit or scope of the disclosure. Thus, the present disclosure is not intended to be limited to the implementations shown herein but is to be accorded the widest scope consistent with the following claims and the principles and novel features disclosed herein.

What is claimed is:

1. A method for adapting communication between a low-speed interface and a high-speed interface, the method comprising:
   retrieving, by a microcontroller and via a memory bus, configuration instructions in response to a power-up of the microcontroller, the configuration instructions associated with a low-speed communication protocol;
   sending, by the microcontroller and via an address/data bus, the configuration instructions to a low-speed interface module causing the low-speed interface module to configure an interface of the low-speed interface module based on the configuration instructions;
   entering, by the microcontroller, a low-power mode;
   receiving, by the interface of the low-speed interface module, data associated with the low-speed communication protocol;
   changing, by the low-speed interface module and in response to receiving the data, a state of an interrupt signal causing the microcontroller to wake from the low-power mode;
   retrieving, by the microcontroller via an instruction bus, mapping instructions associated with a high-speed communication protocol; and
   sending, by the microcontroller and via the address/data bus, the mapping instructions to the low-speed interface module, causing the low-speed interface module to convert the data associated with the low-speed communication protocol to data associated with the high-speed communication protocol.

2. The method of claim 1, wherein retrieving configuration instructions comprises:
   receiving, by the microcontroller and via the address/data bus, a request for the configuration instructions from the low-speed interface module, the request comprising the low-speed communication protocol.

3. The method of claim 1, wherein retrieving configuration instructions comprises:
   executing, by the microcontroller and via the instruction bus, instructions stored at an initial address of an instruction memory, the instruction memory separate from the microcontroller and dedicated to the microcontroller.

4. The method of claim 1, wherein the address/data bus is separate from the instruction bus, the address/data bus is separate from the memory bus, and the memory bus is separate from the instruction bus.

5. The method of claim 1, wherein entering the low-power mode comprises:
   executing, by the microcontroller and via the instruction bus, a wait for interrupt (WFI) instruction stored at a first address of an instruction memory, the instruction memory separate from the microcontroller and dedicated to the microcontroller.

6. The method of claim 5, wherein retrieving mapping instructions associated with the high-speed communication protocol comprises:
executing, by the microcontroller and via the instruction bus, a jump to subroutine (JSR) instruction stored at a second address of the instruction memory, causing the microcontroller to execute a subroutine stored at a third address of the instruction memory, the third address stored after the second address.

7. The method of claim 1, the method further comprising:
receiving, by the microcontroller and via the address/data bus, a request for new configuration instructions from the low-speed interface module, the request for new configuration instructions comprising a new low-speed communication protocol, the low-speed communication protocol different than the new low-speed communication protocol.

8. The method of claim 1, the method further comprising:
sending, by the microcontroller and via the address/data bus, new mapping instructions to the low-speed interface module causing the low-speed interface module to convert the data associated with the low-speed communication protocol to data associated with a new high-speed communication protocol, the high-speed communication protocol different than the new high-speed communication protocol.

9. The method of claim 1, the method further comprising:
receiving, by an interface of a high-speed interface module, data associated with the high-speed communication protocol; and
sending, by the microcontroller and via the address/data bus, new mapping instructions to the high-speed interface module causing the high-speed interface module to convert the data associated with the high-speed communication protocol to data associated with the low-speed communication protocol.

10. The method of claim 1:
wherein the low-speed communication protocol comprises at least one of Advanced Microcontroller Bus Architecture (AMBA) Advanced System Bus (ASB), AMBA Advanced Peripheral Bus (APB), AMBA High-Performance Bus (HPB), and AMBA AXI industry standard interfaces;
wherein the high-speed communication protocol comprises at least one of AMBA ASB, AMBA APB, AMBA HPB, and AMBA AXI industry standard interfaces; and
wherein a data rate of the low-speed communication protocol is lower than a data rate of the high-speed communication protocol.

11. An interface adapter for adapting communication between a low-speed interface and a high- speed interface, the interface adapter comprising:
a microcontroller comprising a first input terminal, a second input terminal, a first bidirectional terminal, a second bidirectional terminal, and a third bidirectional terminal;
a high-speed interface module comprising an output terminal, a first bidirectional terminal, a second bidirectional terminal, and a third bidirectional terminal, wherein the output terminal couples to the second input terminal of the microcontroller;
a low-speed interface module comprising an output terminal coupled to the first input terminal of the microcontroller, a first bi-directional terminal, a second bidirectional terminal coupled to the third bidirectional terminal of the microcontroller and the second bidirectional terminal of the high-speed interface module, and a third bidirectional terminal coupled to the third bidirectional terminal of the high-speed interface module; and
an instruction memory comprising a bidirectional output terminal coupled to the second bidirectional terminal of the microcontroller.

12. The interface adapter of claim 11, further comprising a memory comprising a bidirectional terminal coupled to the first bidirectional terminal of the microcontroller.

13. The interface adapter of claim 11, wherein the microcontroller is adapted to send, via the third bidirectional terminal of the microcontroller, configuration instructions associated with a low-speed communication protocol to the low-speed interface module causing the low-speed interface module to configure an interface associated with the first bidirectional terminal of the low-speed interface module based on the configuration instructions.

14. The interface adapter of claim 13, wherein the low-speed interface module is adapted to change, in response to receiving data on the interface that is associated with a low-speed communication protocol, a state of an interrupt signal causing the microcontroller to wake from a low-power mode.

15. The interface adapter of claim 14, wherein the microcontroller is further adapted to:
retrieve, via the first bidirectional terminal of the microcontroller, mapping instructions associated with a high-speed communication protocol; and
send, via the third bidirectional terminal of the microcontroller, the mapping instructions to the low-speed interface module, causing the low-speed interface module to convert the data associated with the low-speed communication protocol to data associated with the high-speed communication protocol.

16. The interface adapter of claim 15, wherein the microcontroller is further adapted to:
execute, via the second bidirectional terminal of the microcontroller, a jump to subroutine (JSR) instruction stored at a first address of the instruction memory, causing the microcontroller to execute a subroutine stored at a second address of the instruction memory, wherein the second address stored after the first address, wherein the subroutine causes the microcontroller to retrieve mapping instructions associated with the high-speed communication protocol.

17. The interface adapter of claim 15, wherein the high-speed interface module is adapted to receive data associated with the high-speed communication protocol.

18. The interface adapter of claim 17, wherein the microcontroller is further adapted to:
send, via the third bidirectional terminal of the microcontroller, new mapping instructions to the high-speed interface module causing the high-speed interface module to convert the data associated with the high-speed communication protocol to data associated with the low-speed communication protocol.

19. The interface adapter of claim 17:
wherein the low-speed communication protocol comprises at least one of Advanced Microcontroller Bus Architecture (AMBA) Advanced System Bus (ASB), AMBA Advanced Peripheral Bus (APB), AMBA High-Performance Bus (HPB), and AMBA AXI industry standard interfaces;

wherein the high-speed communication protocol comprises at least one of AMBA ASB, AMBA APB, AMBA HPB, and AMBA AXI industry standard interfaces; and
wherein a data rate of the low-speed communication protocol is lower than a data rate of the high-speed communication protocol.

20. The interface adapter of claim 17, wherein the microcontroller is further adapted to:
enter the low-power mode by executing, via the second bidirectional terminal of the microcontroller, a wait for interrupt (WFI) instruction stored at a first address of the instruction memory, the instruction memory separate from the microcontroller and dedicated to the microcontroller.

21. A non-transitory computer readable storage medium to store a computer program configured to execute a method for adapting communication between a low-speed interface and a high-speed interface, the method comprising:
retrieving, by a microcontroller and via a memory bus, configuration instructions in response to a power-up of the microcontroller, the configuration instructions associated with a low-speed communication protocol;
sending, by the microcontroller and via an address/data bus, the configuration instructions to a low-speed interface module causing the low-speed interface module to configure an interface of the low-speed interface module based on the configuration instructions;
entering, by the microcontroller, a low-power mode;
receiving, by the interface of the low-speed interface module, data associated with the low-speed communication protocol;
changing, by the low-speed interface module and in response to receiving the data, a state of an interrupt signal causing the microcontroller to wake from the low-power mode;
retrieving, by the microcontroller via an instruction bus, mapping instructions associated with a high-speed communication protocol; and
sending, by the microcontroller and via the address/data bus, the mapping instructions to the low-speed interface module, causing the low-speed interface module to convert the data associated with the low-speed communication protocol to data associated with the high-speed communication protocol.

22. The non-transitory computer readable storage medium of claim 21, the method further comprising:
receiving, by an interface of a high-speed interface module, data associated with the high-speed communication protocol; and
sending, by the microcontroller and via the address/data bus, new mapping instructions to the high-speed interface module causing the high-speed interface module to convert the data associated with the high-speed communication protocol to data associated with the low-speed communication protocol.

23. An interface adapter for adapting communication between two interfaces, the interface adapter comprising:
a microcontroller comprising a first input terminal, a second input terminal, a first bidirectional terminal, a second bidirectional terminal, and a third bidirectional terminal;
a transmitting interface module comprising an output terminal, a first bidirectional terminal, a second bidirectional terminal, and a third bidirectional terminal, wherein the output terminal couples to the second input terminal of the microcontroller;
a receiving interface module comprising an output terminal coupled to the first input terminal of the microcontroller, a first bi-directional terminal, a second bidirectional terminal coupled to the third bidirectional terminal of the microcontroller and the second bidirectional terminal of the transmitting interface module, and a third bidirectional terminal coupled to the third bidirectional terminal of the transmitting interface module; and
an instruction memory comprising a bidirectional output terminal coupled to the second bidirectional terminal of the microcontroller.

24. The interface adapter of claim 23:
wherein the transmitting interface module is associated with a low-speed communication protocol and the receiving interface module is associated with a high-speed communication protocol;
wherein the low-speed communication protocol comprises at least one of Advanced Microcontroller Bus Architecture (AMBA) Advanced System Bus (ASB), AMBA Advanced Peripheral Bus (APB), AMBA High-Performance Bus (HPB), and AMBA AXI industry standard interfaces;
wherein the high-speed communication protocol comprises at least one of AMBA ASB, AMBA APB, AMBA HPB, and AMBA AXI industry standard interfaces; and
wherein a data rate of the low-speed communication protocol is lower than a data rate of the high-speed communication protocol.

* * * * *